(12) United States Patent
Mukherjee et al.

(10) Patent No.: US 10,813,122 B2
(45) Date of Patent: Oct. 20, 2020

(54) METHODS AND APPARATUS FOR SCHEDULING AND/OR GRANTING UPLINK RESOURCES

(71) Applicant: Charter Communications Operating, LLC, St. Louis, MO (US)

(72) Inventors: Amitav Mukherjee, Elk Grove, CA (US); Maulik Vaidya, Palmdale, CA (US)

(73) Assignee: Charter Communcations Operating, LLC, St. Louis, MO (US)

( * ) Notice: Subject to any disclaimer, the term of this patent is extended or adjusted under 35 U.S.C. 154(b) by 0 days.

(21) Appl. No.: 16/276,490

(22) Filed: Feb. 14, 2019

(65) Prior Publication Data

US 2020/0267752 A1    Aug. 20, 2020

Related U.S. Application Data

(60) Provisional application No. 62/805,844, filed on Feb. 14, 2019.

(51) Int. Cl.
| | |
|---|---|
| H04W 72/12 | (2009.01) |
| H04W 76/36 | (2018.01) |
| H04W 28/06 | (2009.01) |
| H04W 28/02 | (2009.01) |

(Continued)

(52) U.S. Cl.
CPC ..... *H04W 72/1294* (2013.01); *H04L 27/2663* (2013.01); *H04W 28/0278* (2013.01); *H04W 28/06* (2013.01); *H04W 72/0446* (2013.01); *H04W 76/36* (2018.02)

(58) Field of Classification Search
CPC ..... H04W 28/02; H04W 28/06; H04W 72/00; H04W 72/04; H04W 72/044; H04W 72/0446; H04W 72/1278; H04W 72/1289; H04W 72/1294; H04W 72/12; H04W 72/121; H04W 72/14; H04W 76/36; H04L 27/26

See application file for complete search history.

(56) References Cited

U.S. PATENT DOCUMENTS

| | | | |
|---|---|---|---|
| 2010/0091728 A1* | 4/2010 | Kim | H04W 72/04 370/329 |
| 2013/0064103 A1* | 3/2013 | Koskela | H04W 72/1284 370/252 |
| 2019/0124571 A1* | 4/2019 | Kong | H04W 36/02 |

(Continued)

*Primary Examiner* — Kan Yuen
(74) *Attorney, Agent, or Firm* — Straub & Straub; Michael P. Straub; Stephen T. Straub

(57) ABSTRACT

A base station schedules a user equipment (UE) for uplink air link resources, e.g., unlicensed spectrum PUSCH resources, corresponding to one or more slots and, in some embodiments, at least one mini-slot. There may be, and sometimes are gaps between two scheduled slots and/or between a scheduled slot and a scheduled mini-slot. Different uplink air link resources corresponding to a schedule slot or mini-slot may, and sometimes do, use different set of frequencies. The base station generates and sends to the UE a single UL grant which grants uplink air link resources corresponding to the composite of resource allocations corresponding to the one or more slots and, in some embodiments, at least one mini-slot. The single UL grant may, and sometimes does, communicates gap information and frequency information.

18 Claims, 17 Drawing Sheets

(51) Int. Cl.
*H04W 72/04* (2009.01)
*H04L 27/26* (2006.01)

(56) References Cited

U.S. PATENT DOCUMENTS

2019/0364449 A1* 11/2019 Yang ................... H04W 76/27
2019/0364592 A1* 11/2019 Bhattad ............. H04W 72/1289

* cited by examiner

METHODS AND APPARATUS FOR SCHEDULING AND/OR GRANTING UPLINK RESOURCES

RELATED APPLICATIONS

The present application claims the benefit of U.S. Provisional patent application Ser. No. 62/805,844 which was filed on Feb. 14, 2019 and which is hereby expressly incorporated by reference in its entirety.

FIELD

The present application relates to communications methods and apparatus, and more particularly, to method and apparatus related to efficiently scheduling uplink resources, granting uplink resources, and/or using uplink resources, e.g. corresponding to a physical uplink shared channel.

BACKGROUND

Long Term Evolution (LTE) Licensed Assisted Access (LAA) and its enhancements (Enhanced LAA/Further Enhanced LAA (eLAAA/FeLAA)), were introduced in 3GPP Releases 13-15 to specify Downlink (DL) and Uplink (UL) LTE in unlicensed spectrum, primarily 5 GHz. eLAA supports the scheduling of multiple Physical Uplink Shared Channel (PUSCH) transmissions in up to 4 UL subframes using a single UL grant for efficiency, as opposed to using four separate UL grants.

From an efficiency it would be desirable if multi-TTI PUSCH scheduling using a single UL grant could be supported in NR-U. However, NR-U seeks to make more efficient and/or flexible use of uplink resources. Simply granting multiple contiguous uplink resources of the same size in an UL grant would result in a system which is less flexible than is desired for NR-U.

In view of the above it should be appreciated that there is a need for methods and/or apparatus which would allow for multiple uplink resources to be scheduled to a UE and the grant communicated in a single message while allowing for a fair amount of flexibility in terms of the size, time/frequency location and/or spacing between granted UL resources.

SUMMARY

A base station, e.g., a gNB, schedules a user equipment (UE) device to use uplink air link resources, e.g., unlicensed spectrum Physical Uplink Shared Channel (PUSCH), Physical Uplink Control Channel (PUCCH), or Physical Random Access Channel (PRACH) air link resources, corresponding to one or more slots and, in some embodiments, at least one mini-slot. A mini-slot is a resource smaller in time than a slot. In 3GPP a mini-slot is referred to as a non-slot. There may be, and sometimes are gaps between two scheduled slots and/or between a scheduled slot and a scheduled mini-slot, which are scheduled to the UE. Different uplink air link resources, corresponding to a scheduled slot or a scheduled mini-slot, may, and sometimes do, use different sets of frequencies. The base station generates and sends the UE a single UL grant message, for e.g., on a Physical Downlink Control Channel (PDCCH), said single uplink grant message grants uplink air link resources corresponding to the composite of resource allocations corresponding to the one or more slots and, in some embodiments, at least one mini-slot, and communicates information to identify the allocated UL resources, e.g., PUSCH time-frequency resource blocks, which have allocated to the UE to use for uplink signaling. The single UL grant may, and sometimes does, further include gap information and/or frequency information. In some embodiments, the UE may, and sometimes does, communicates that it does not need all of its granted UL resources corresponding to a received single uplink grant message via communicating a null buffer status report to the base station in one of the granted resources or by sending a notification signal to the base station in licensed spectrum. The base station may, and sometimes does, then re-allocate unused previously granted resources to another UE.

While an UL grant may communicate a grant of a combination of full slots and mini-slots which may correspond to sets of contiguous time slots separated by a gap, in at least some embodiments the UL grant is a grant of full slots but different time/frequency resources being granted for different slots and/or gaps between the slots for which resources are granted. Thus it should be appreciated that the features relating to granting a portion of a slot, e.g., a mini-slot, need not be used in all embodiments and the features relating to granting UL resources and/or resources with a gap between them can be used alone or in combination with the granting of one or more mini-slots. Accordingly, while various features are explained in the context of an example where a mini-slot is among the granted resources communicated in a single UL grant message, the granting of one or more mini-slots is not needed or used in all embodiments.

An exemplary method of operating a base station, in accordance with some embodiments, comprises: scheduling a first user equipment (UE) for uplink transmission in a combination of one or more uplink slots and at least one mini-slot, said uplink slot having a first predetermined duration, said mini-slot having a second predetermined duration which is smaller than said first predetermined duration; and transmitting a single UL grant message to the first UE communicating a grant of the scheduled combination of said one or more uplink slots and said at least one mini-slot. An exemplary base station, in accordance with some embodiments, comprises: a processor configured to: schedule a first user equipment (UE) for uplink transmission in a combination of one or more uplink slots and at least one mini-slot, said uplink slot having a first predetermined duration, said mini-slot having a second predetermined duration which is smaller than said first predetermined duration; and operate the base station to transmit a single UL grant message to the first UE communicating a grant of the scheduled combination of said one or more uplink slots and said at least one mini-slot.

While various features discussed in the summary are used in some embodiments it should be appreciated that not all features are required or necessary for all embodiments and the mention of features in the summary should in no way be interpreted as implying that the feature is necessary or critical for all embodiments. Numerous variations on the above described methods and apparatus are described in the detailed description which follows.

DETAILED DESCRIPTION

Figure 1:
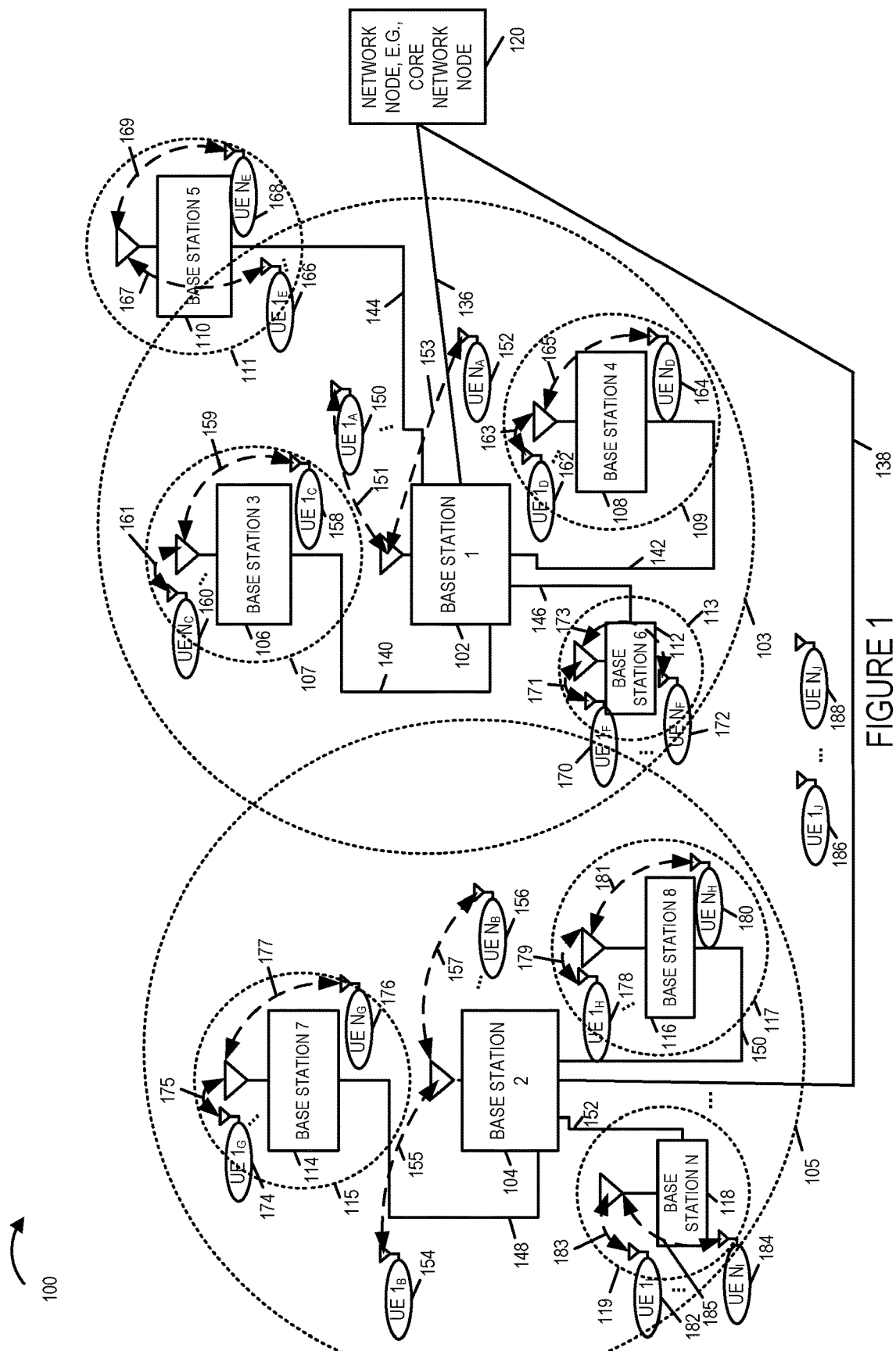
FIG. 1 is a drawing of an exemplary communications system 100 in accordance with an exemplary embodiment.

FIG. 1 is a drawing of an exemplary communications system 100 in accordance with an exemplary embodiment. Exemplary communications system 100 includes a plurality of base stations (base station 1 102, base station 2 104, base station 3, 106, base station 4 108, base station 5 110, base station 6 112, base station 7 114, base station 8 116, . . . , base station N 118), each with a corresponding wireless coverage area (103, 105, 107, 109, 111, 113, 115, 117, . . . , 119), and a network node 120, e.g., a core network node, coupled together as shown in FIG. 1. The base stations (base station 1 102, base station 2 104, base station 3, 106, base station 4 108, base station 5 110, base station 6 112, base station 7 114, base station 8 116, . . . , base station N 118), are, e.g., g-NBs, which support using new radio unlicensed spectrum (NR-U) to communicate with the UEs. Exemplary communications system 100 further includes a plurality of user equipment devices (UE 1A 150, . . . , UE NA 152, UE 1B 154, . . . , UE NB 156, UE 1C 158, . . . , UE NC 160, UE 1D 162, . . . , UE ND 164, UE 1E 166, . . . , UE NE 168, UE 1F 170, . . . , UE NF 172, UE 1G 174, . . . , UE NG 176, UE 1H 178, . . . , UE NH 180, UE 1I 182, . . . , UE NI 184, UE 1J 186, . . . , UE NJ 188). At least some of the UEs (150, . . . , 152, 154, . . . , 156, 158, . . . , 160, 162, . . . , 164, 166, . . . , 168, 170, . . . , 172, 174, . . . , 176, 178, . . . , 180, 182, . . . , 184, 186, 188) are mobile devices which may move throughout the communications system, and be handed off between different base stations.

Base station 1 102 is coupled to network node 120 via communications link 136. Base station 2 104 is coupled to network node 120 via communications link 138. Base station 3 106 is coupled to base station 1 102 via communications link 140. Base station 4 110 is coupled to base station 1 102 via communications link 142. Base station 5 110 is coupled to base station 1 102 via communications link 144. Base station 6 112 is coupled to base station 1 102 via communications link 146. Base station 7 114 is coupled to base station 2 104 via communications link 148. Base station 8 116 is coupled to base station 2 104 via communications link 150. Base station N 118 is coupled to base station 2 104 via communications link 152. In some embodiments, one or more or all of BSs (BS 3 106, BS 4 108, BS 5 110, BS 6 112, BS 7 114, BS 8 116, . . . , BS N 118) are coupled to network node 120 via a communications path that does not traverse another base station.

In some embodiments, base station 1 102 and base station 2 104 are large cell base stations and base station (BS 3 106, BS 4 108, BS 5 110, BS 6 112, BS 7 114, BS 8 116, ..., BS N 118) are small cell base stations, e.g., femto or pico cell base stations.

UEs (UE 1A 150, ..., UE NA 152) are currently located within cell 1 103, are coupled to base station 1 102 via wireless links (151, ..., 153), respectively, and are receiving UL grants in Downlink control information (DCI) from base station 1 102, said UL grants scheduling Physical Uplink Shared Channel (PUSCH) air link resources. UEs (UE 1B 154, ..., UE NB 156) are currently located within cell 2 105, are coupled to base station 2 104 via wireless links (155, ..., 157), respectively, and are receiving UL grants in Downlink control information (DCI) from base station 2 104, said UL grants scheduling Physical Uplink Shared Channel (PUSCH) air link resources. UEs (UE 1C 158, ..., UE NC 160) are currently located within cell 3 107, are coupled to base station 3 106 via wireless links (159, ..., 161), respectively, and are receiving UL grants in Downlink control information (DCI) from base station 3 106, said UL grants scheduling Physical Uplink Shared Channel (PUSCH) air link resources. UEs (UE 1D 162, ..., UE ND 164) are currently located within cell 4 109, are coupled to base station 4 108 via wireless links (163, ..., 165), respectively, and are receiving UL grants in Downlink control information (DCI) from base station 4 108, said UL grants scheduling Physical Uplink Shared Channel (PUSCH) air link resources. UEs (UE 1E 166, ..., UE NE 168) are currently located within cell 5 111, are coupled to base station 5 110 via wireless links (167, ..., 169), respectively, and are receiving UL grants in Downlink control information (DCI) from base station 5 110, said UL grants scheduling Physical Uplink Shared Channel (PUSCH) air link resources. UEs (UE 1F 170, ..., UE NF 172) are currently located within cell 6 113, are coupled to base station 6 112 via wireless links (171, ..., 173), respectively, and are receiving UL grants in Downlink control information (DCI) from base station 6 112, said UL grants scheduling Physical Uplink Shared Channel (PUSCH) air link resources. UEs (UE 1G 174, ..., UE NG 176) are currently located within cell 7 115, are coupled to base station 7 114 via wireless links (175, ..., 177), respectively, and are receiving UL grants in Downlink control information (DCI) from base station 7 114, said UL grants scheduling Physical Uplink Shared Channel (PUSCH) air link resources. UEs (UE 1H 178, ..., UE NH 180) are currently located within cell 8 117, are coupled to base station 8 116 via wireless links (179, ..., 181), respectively, and are receiving UL grants in Downlink control information (DCI) from base station 8 116, said UL grants scheduling Physical Uplink Shared Channel (PUSCH) air link resources. UEs (UE 1I 182, ..., UE NI 184) are currently located within cell N 119, are coupled to base station N 118 via wireless links (183, ..., 185), respectively, and are receiving UL grants in Downlink control information (DCI) from base station N 118, said UL grants scheduling Physical Uplink Shared Channel (PUSCH) air link resources.

In some embodiments, at least some individual grants schedule multiple PUSCH slots to the same UE, e.g. multi-TTI PUSCH scheduling. In some embodiments, at least some individual grants include information identifying a gap between scheduled PUSCH resources, e.g., slots and/or mini-slots, which are scheduled to the same UE. In some embodiments, at least some individual grants include information identifying different frequency-domain resources or interlaces, e.g., at least some different slots and/or mini-slots, in a single grant which are scheduled to the same UE, identify different frequency-domain resources that are to be used by the UE for uplink transmissions, facilitating dynamic bandwidth adaptation and wideband carrier operation. In some embodiments, at least some individual grants include information scheduling a mini-slot.

Figure 2:
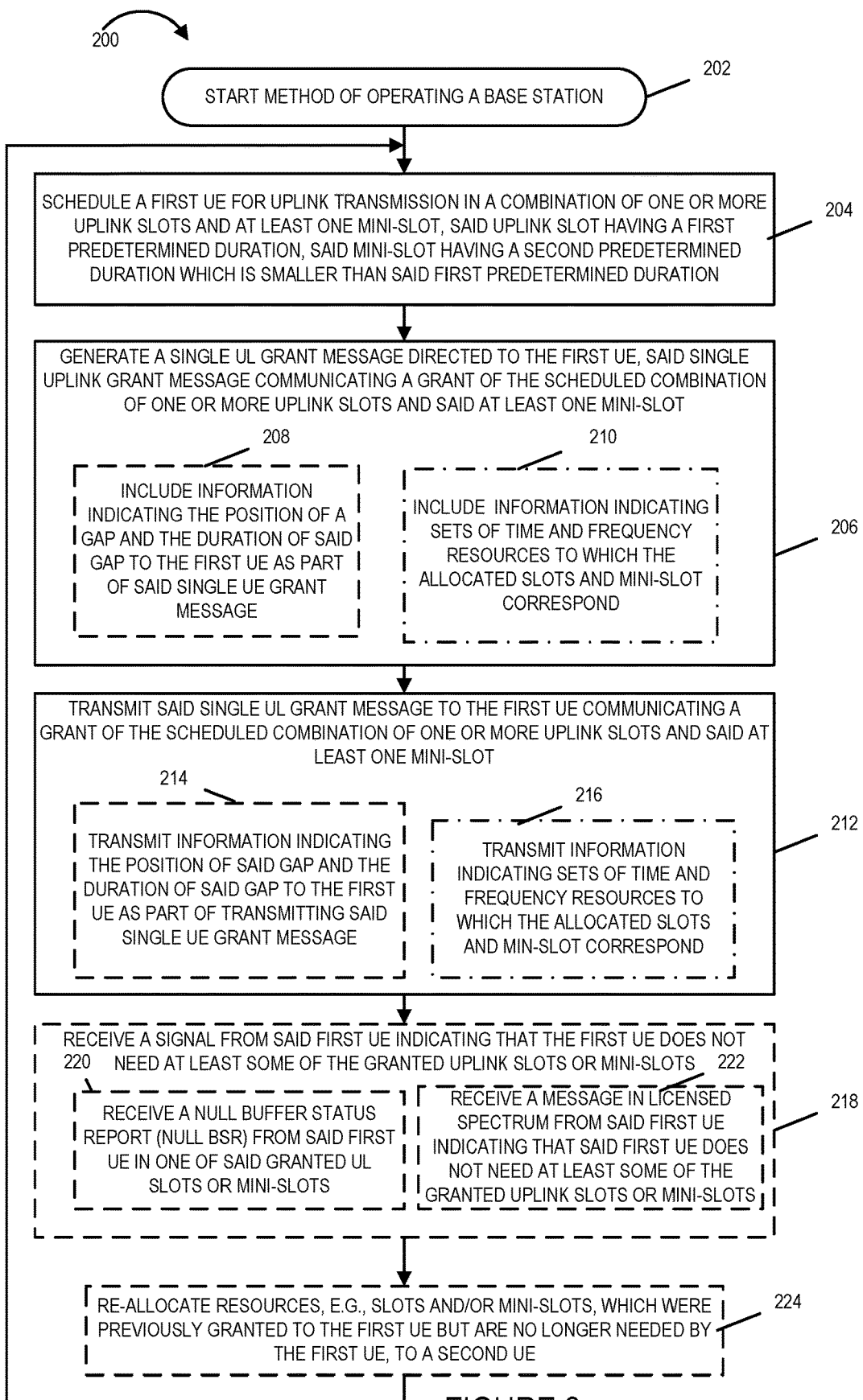
FIG. 2 is flowchart of an exemplary method of operating a base station in accordance with an exemplary embodiment.

FIG. 2 is flowchart 200 of an exemplary method of operating a base station in accordance with an exemplary embodiment. The base station implementing the method of flowchart 200 is, e.g., one of the base stations of system 100 of FIG. 1, e.g. BS 1 102, e.g., a gNB using new radio unlicensed (NR-U) spectrum.

Operation starts in step 202 in which the base station is powered on and initialized. Operation proceeds from step 202 to step 204. In step 204, the base station schedules a first UE, e.g., UE 1A 150 of FIG. 1, for transmission in a combination of one or more uplink slots and at least one mini-slot, said uplink slot having a first predetermined time duration, said mini-slot having a second predetermined duration which is smaller than said first predetermined duration. In some embodiments, the second predetermined duration is an integer fraction of said first predetermined duration.

In some embodiments, the at least one mini-slot includes a plurality of mini-slots scheduled for use by the first UE. In some such embodiments, the plurality of mini-slots includes a first mini-slot that precedes a first uplink slot scheduled for use by the first UE and a second mini-slot that follows said first uplink slot scheduled for use by the first UE. In some such embodiments, the first UE is scheduled only full slots between said first mini-slot and said second mini-slot.

Operation proceeds from step 204 to step 206. In step 206 the base station generates a single uplink grant message directed to the first UE, said single UL grant message communicating a grant of the scheduled combination of one or more uplink slots and said at least one mini-slot. In some embodiments, step 206 includes one or both of steps 208 and 210. In step 208 the base station includes information indicating the position of a gap and the duration of said gap the first UE, as part of said single UL grant message. In step 210 the base station includes information indicating sets of time and frequency resources to which the allocated slots and mini-slots correspond. Operation proceeds from step 206 to step 212.

In step 212 the base station transmits said single UL grant message to the first UE communicating a grant of the scheduled combination of one or more uplink slots and said at least one mini-slot. In some embodiments, step 212 includes one or both of steps 214 and 216.

In some embodiments, a gap in time exists between at least one of the one or more uplink slots allocated to the first UE or an uplink slot and a mini-slot allocated to the first UE, and step 214 is performed. In step 214 the base station transmits information indicating the position of a gap and the duration of said gap to the first UE, as part of transmitting said single UL grant message. In some embodiments, said gap is an integer multiple of the first predetermined duration. In some embodiments, the gap is indicated by indicating positions in an uplink timing structure or slots and mini-slots scheduled for use by the first UE or by indicating a continuous sequence of slots and mini-slots with the location of the gap in the contiguous slots being indicated in the grant message.

In some embodiments, the granted slots and mini-slots include slots which vary in time and frequency, e.g., a first slot corresponding to a first time uses a first set of frequencies, and a second slot corresponding to a second time uses a second set of frequencies, wherein said second set of frequencies includes at least some frequencies which are different than the frequencies of said first set of frequencies, and step 216 is performed. In step 216 the base station transmits information indicating sets of time and frequency resources to which the allocated slots and mini-slots correspond, as part of transmitting said single UL grant.

In some embodiments, operation may, and sometimes does, proceed from step 212 to step 218. In other embodiments, step 218 is omitted and operation proceeds from step 212 to step 204, in which the base station again schedules the first UE for uplink transmission.

In step 218 the base station receives a signal from said first UE indicating that first UE does not need at least some of the granted unlink slots or mini-slots. In some embodiments, step 218 includes one of step 220 and step 222. In step 220 the base station receives a null buffer status report (null BSR) from said first UE in one of granted UL slots or mini-slots. In step 222, the base station receives a message in licensed spectrum from the first UE indicating that the first UE does not need at least some of the granted UL slots or mini-slots. Operation proceeds from step 218 to step 220.

In step 220 the base station re-allocates resources, e.g. slots and/or min-slots, which were previously granted to the first UE but are no longer needed by the first UE to a second UE, e.g., UE NA 152 of FIG. 1. Operation proceeds from step 220 to step 204, in which the base station again schedules the first UE for uplink transmission.

Figure 3:
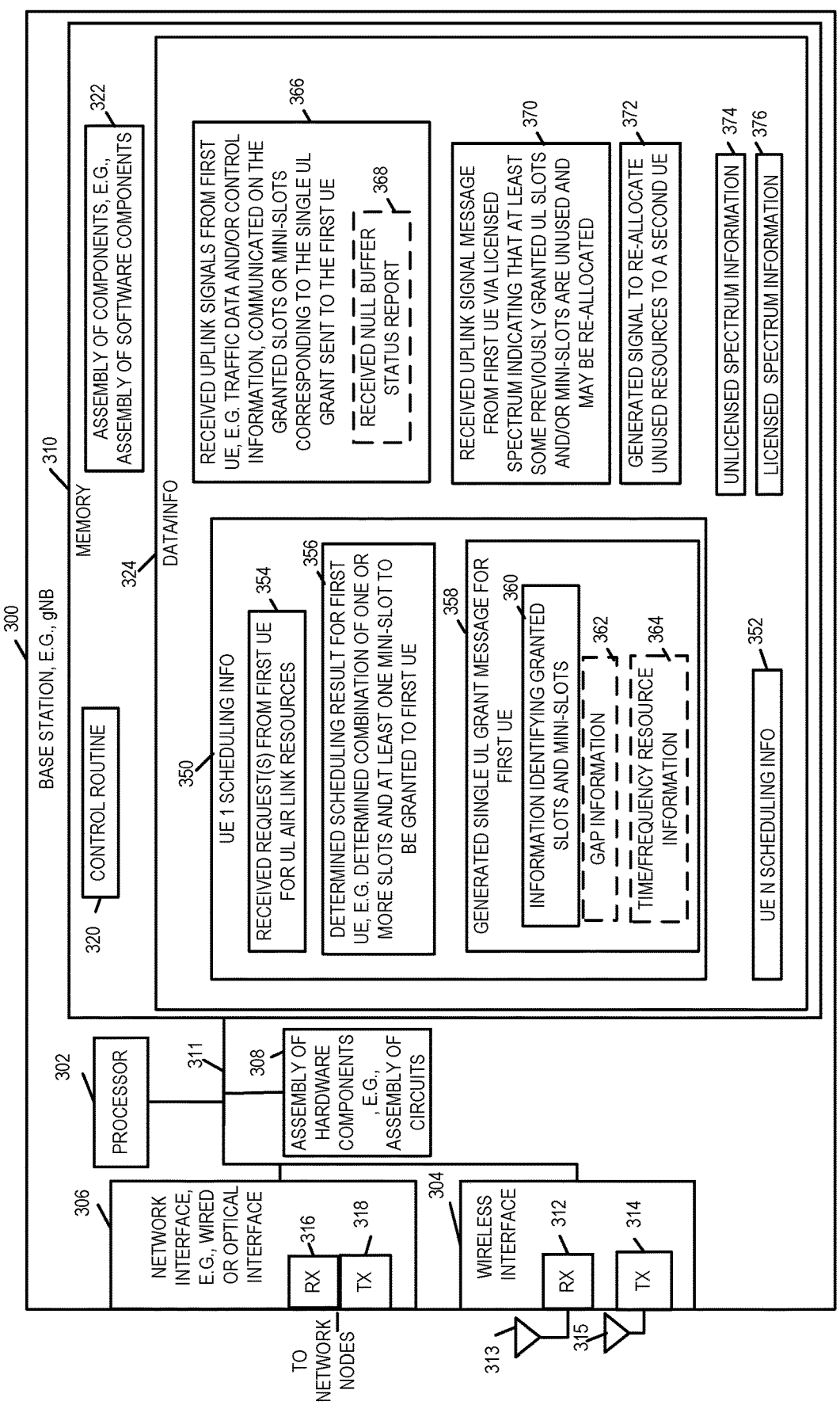
FIG. 3 is a drawing of an exemplary base station in accordance with an exemplary embodiment.

FIG. 3 is a drawing of an exemplary base station 300, in accordance with an exemplary embodiment. In some embodiments, exemplary base station 300 of FIG. 3 implements steps of the exemplary method of flowchart 200 of FIG. 2. Base station 300 is, e.g., any of base stations (base station 1 102, base station 2 106, base station 3 106, base station 4, 108, base station 5 110, Base station 6 112, base station 7, 114, base station 8 116, . . . , base station N 118) of FIG. 1, e.g., BS 1 102 of FIG. 1.

Base station 300 includes a processor 302, e.g., a CPU, wireless interface 304, a network interface 306, e.g., a wired or optical interface, an assembly of hardware components 308, e.g., an assembly of circuits, and memory 310 coupled together via a bus 311 over which the various elements may interchange data and information.

Network interface 306 includes a receiver 316 and a transmitter 318. Network interface 306 to coupled to network nodes, e.g., via a backhaul network and/or the Internet. Wireless interface 304 includes a wireless receiver 312 and a wireless transmitter 314. The base station 300, e.g., BS 1 102, receives signals from network devices, e.g., network node 120, and other base stations, e.g., base station 3 106 and base station 4 108, via network receiver 316. The base station 300, e.g., BS 1 102, sends signals to network devices, e.g., network node 120, and other base stations, e.g., base station 3 106 and base station 4 108, via network transmitter 318. Wireless receiver 312 is coupled to a receive antenna 313 via which the base station 300, e.g., BS 1 102, can receive wireless signals, e.g., wireless signals from UE devices, e.g., UE 1A 150 and UE NA 152. Wireless transmitter 314 is coupled to a transmit antenna 315 via which the base station 300 can transmit wireless signals to UE devices. Exemplary received wireless signals include uplink signals using allocated slots and mini-slots in unlicensed spectrum from a UE device, which is being serviced by base station 300. The received uplink signals include, e.g., traffic data, and control information. The control information may, and sometimes does include a null buffer status report, signifying that the UE does not need all of its allocated UL slots or mini-slots. Another exemplary received wireless signal is a message communicated over licensed spectrum indicating that a UE does not need all of its all allocated uplink slots or mini-slots. An exemplary transmitted wireless signal, transmitted via wireless transmitted 314, is a signal communicating a single UL grant message directed to a UE, e.g., a first UE, said single UL grant message communicating a grant of a scheduled combination of one or more uplink slots and at least one mini-slot, to said UE. Another exemplary transmitted wireless signal, transmitted via wireless transmitted 314, is a signal communicating a single UL grant message directed to a UE, e.g., a first UE, said single UL grant message communicating a grant of a scheduled combination of multiple uplink slots to a UE, wherein there is at least one gap between some of said multiple granted slots or at least some different granted slots use different sets of time-frequency resources.

Memory 310 includes a control routine 320, e.g., for controlling basic functions of the base station, an assembly of components 322, e.g., an assembly of software components, and data/information 324. Data/information 324 includes UE scheduling related information (UE 1 (first UE currently being serviced by BS 300) scheduling information 350, . . . , UE N (Nth UE currently being service by BS 300) scheduling information 362). UE 1 scheduling information 350 includes received request(s) from a first UE, e.g., UE 150, for UL air link resources 254, determined scheduling results for the first UE 356, e.g., a determined combination of one or more UL slots and at least one UL mini-slot to be granted to the first UE for use by the first UE, a generated single UL grant message 358 to be transmitted to the first UE, e.g., in downlink control information (DCI), said generated UL single UL grant message communicating information identifying one or more UL slots and at least one UL mini-slot. Generated single UL grant message for first UE 358 includes information 360 identifying the granted slots and mini-slots which are being allocated to the first UE. In some embodiments, the generated single UL grant message for first UE 358 includes one or both of: i) gap information, e.g. information identifying gaps between slots and/or gaps between slots and mini-slots, or ii) time frequency resource information for the allocated slots and/or mini-slots, e.g. wherein different slots and/or mini-slots in the grant message may, and sometimes do, correspond to different sets of frequencies.

Data/information 324 further includes received uplink signals from first UE, e.g., received uplink signals communicating UL traffic data and/or control information, which were communicated on the granted slots and/or granted mini-slots corresponding to the single UL grant sent to the first UE 366. In some embodiments, the received uplink signals from first UE which were communicated on the granted slots and/or granted mini-slots corresponding to the single UL grant sent to the first UE 366 includes a received null buffer status report 368, e.g., used to indicate that the first UE does not need all of the allocated slots an mini-slots of the single UL grant. In some embodiments, the location of null buffer is used to indicate which previously granted slots and/or mini-slots are unused and can be re-assigned by the base station. For example, in one embodiment, any slots or mini-slots of the single grant following the particular slot in which the null BSR was received may be re-assigned by the base station.

In some embodiments, data/information 324 further includes a received uplink signal message from the first UE, which was communicated via licensed spectrum, indicating that at least some of the previously granted UL slots and/or mini-slots are unused and may be re-allocated. In some embodiments, data/information 324 includes a generated signal to re-allocate unused resources, e.g., UL slots and/or mini-slots which were previously granted to the first UE, to a second UE, e.g. UE NA 152.

Data/information 324 further includes unlicensed spectrum information 374, e.g., frequency information, timing structure information, protocol information, and message structure information corresponding to unlicensed spectrum communications, e.g., NR-U, which are being implemented by base station 300, and licensed spectrum information 376, e.g., frequency information, timing structure information, protocol information, and message structure information corresponding to licensed spectrum communications, e.g., NR licensed spectrum communications, which are being implemented by base station 300

Figure 4:
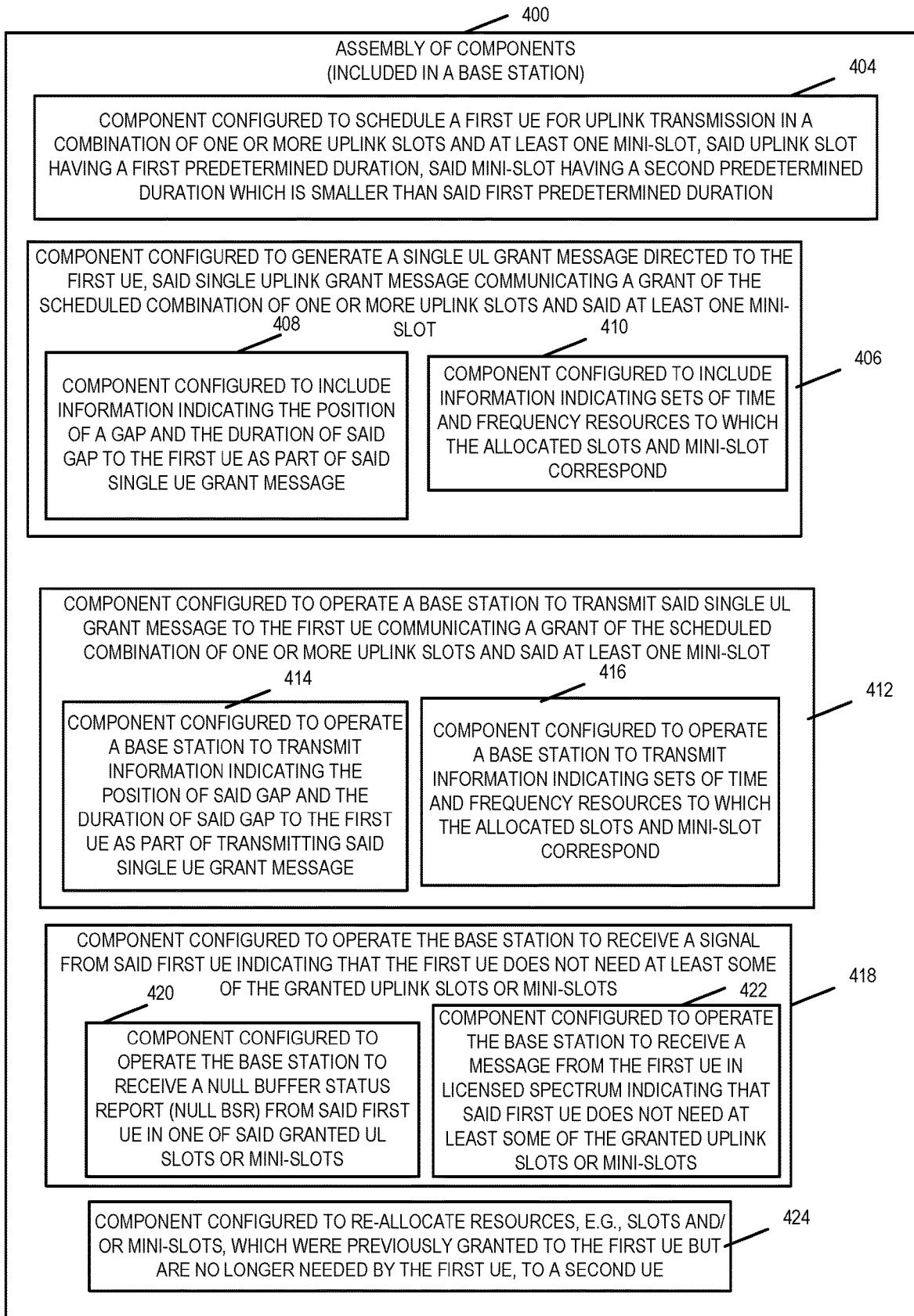
FIG. 4, is a drawing of an exemplary assembly of components which may be, and sometimes is, included in a base station in accordance with an exemplary embodiment.

FIG. 4, is a drawing of an exemplary assembly of components 400 in accordance with an exemplary embodiment. Exemplary assembly of components 400, which may be, and sometimes is, included in a base station, such as the exemplary base station 300 of FIG. 3, or base station 102 of FIG. 1, implements steps of an exemplary method, e.g., steps of the method of the flowchart 200 of FIG. 2.

Assembly of components 400 can be, and in some embodiments is, used in base station 300, e.g., of FIG. 3, base station 1 102 of FIG. 1, or any of the other base stations of FIG. 1. The components in the assembly of components 400 can, and in some embodiments are, implemented fully in hardware within the processor 302, e.g., as individual circuits. The components in the assembly of components 400 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 310 of the base station 300, with the components controlling operation of the base station to implement the functions corresponding to the components when the components are executed by a processor, e.g., processor 302. In some such embodiments, the assembly of components 400 is included in the memory 310 as assembly of components 322. In still other embodiments, various components in assembly of components 400 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the base station 300, or elements therein such as the processor 302, to perform the functions of corresponding steps illustrated and/or described in the method of one or more of the flowcharts, signaling diagrams and/or described with respect to any of the Figures. Thus the assembly of components 400 includes various components that perform functions of corresponding one or more described and/or illustrated steps of an exemplary method, e.g., steps of the method of flowchart 200 of FIG. 2 and/or described or shown with respect to any of the other figures.

Assembly of components 400 includes a component 404, e.g., a scheduler, configured to schedule a first UE for uplink transmission in a combination of one or more uplink slots and at least one-mini-slot, said uplink slot having a first predetermined duration, said mini-slot having a second predetermined duration which is smaller than said first predetermined duration, and a component 406 configured to generate a single UL grant message directed to the first UE, said single uplink grant message communicating a grant of the scheduled combination or one or more uplink slots and said at least one mini-slot. Component 406 includes a component 408 configured to include information indicating the position of a gap and the duration of said gap to the first UE as part of said single UL grant message, and a component 410 configured to include information indicating sets of time and frequency resources to which the allocated slots and mini-slots correspond.

Assembly of components 400 further includes a component 412 configured to operate a base station to transmit, e.g., via wireless transmitter 314, said single UL grant message to the first UE, said single UL grant message communicating a grant of the scheduled combination of one or more uplink slots and said at least one mini-slot. Component 412 includes a component 414 configured to operate a base station to transmit information indicating the position of said gap and the duration of said gap to the first UE as part of transmitted said single UE grant message, and a component 416 configured to operate a base station to transmit information indicating sets of time and frequency resources to which the allocated slots and mini-slots correspond.

Assembly of components 400 further includes a component 418 configured to operate the base station to receive, e.g., via wireless receiver 312, a signal from said first UE indicating that the first UE does not need at least some of the granted UL slots or mini-slots. Component 418 includes a component 420 configured to operate the base station to receive a null buffer status report (null BSR) from said first UE in one of said granted UL slots or mini-slots, and a component 422 configured to operate the base station to receive a message from the first UE in licensed spectrum indicating that said first UE does not need at least some of the granted uplink slots or mini-slots. Assembly of components 400 further includes a component 424 configured to re-allocate resources, e.g., slots and/or mini-slots, which were previously granted to the first UE but are no longer needed by the first UE, to a second UE.

Figure 5:
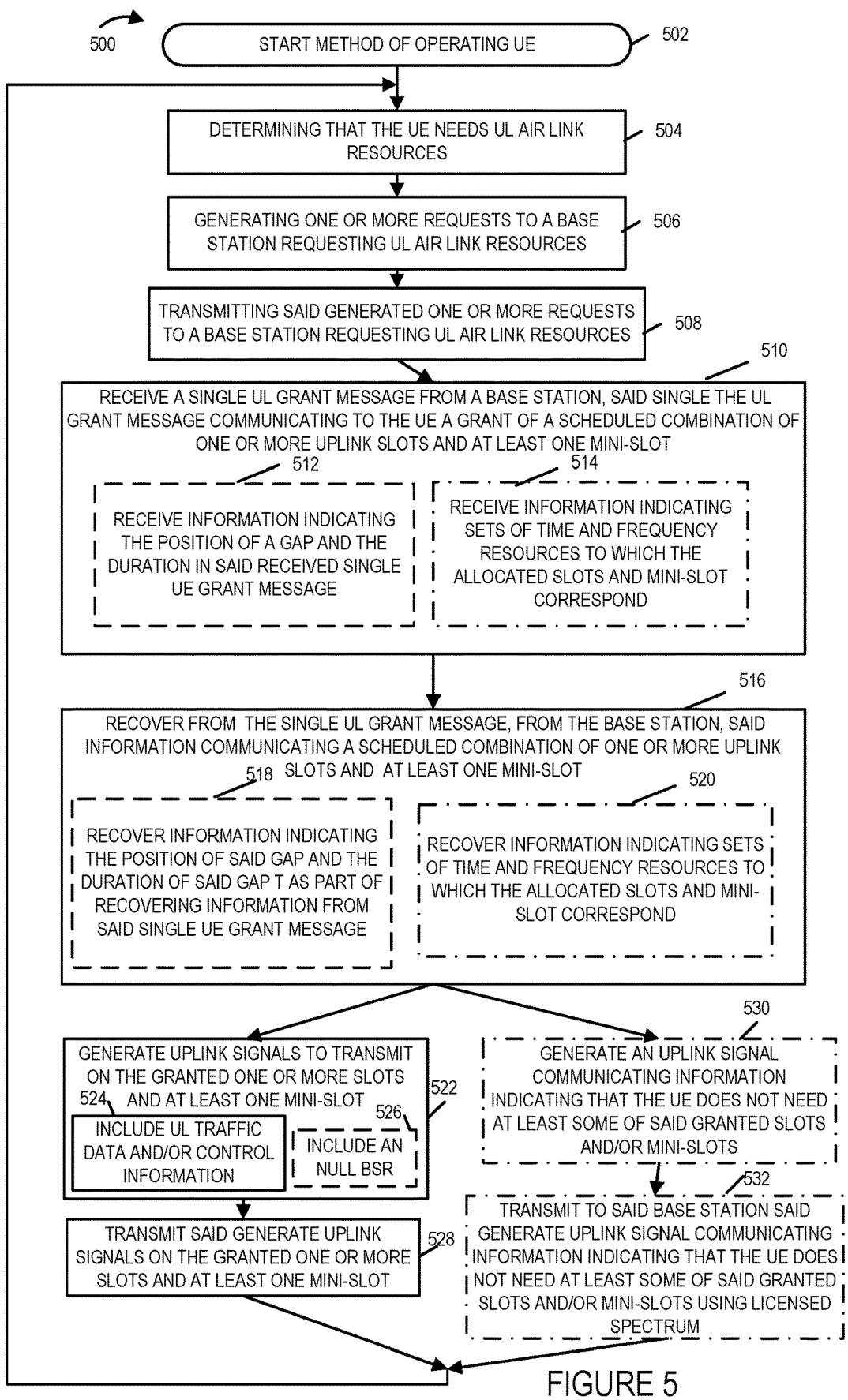
FIG. 5 is a flowchart of an exemplary method of operating a user equipment (UE) device in accordance with an exemplary embodiment.

FIG. 5 is a flowchart 500 of an exemplary method of operating a user equipment (UE) in accordance with an exemplary embodiment. The UE implementing the method of flowchart 500 is, e.g. UE 400 of FIG. 4, which is, e.g., one of the UEs of system 100 of FIG. 1, e.g., UE 1A 150.

Operation of the exemplary method starts in step 502 in which the UE is powered on and initialized. Operation proceeds from start step 502 to step 504.

In step 504 the UE determines that it needs UL air link resources, e.g., unlicensed spectrum UL air link resources to transmit uplink signals including data and information, to a base station to which it is connected. Operation proceeds from step 504 to step 506.

In step 506 the UE generates one or more requests, e.g., UL resource request messages, to a base station requesting UL air link resources. Operation proceeds from step 506 to step 508, in which the UE transmits said generated one or more requests to the base station requesting UL air link resources. Operation proceeds from step 506 to step 508. In step 508 the UE transmits the generated one or more requests to the base station request UL air link resources. Operation proceeds from step 508 to step 510.

In step 510 the UE receives a single UL grant message from the base station, said single UL grant message communicating to the UE a grant of a scheduled combination of one or more uplink slots and at least one mini-slot. In some embodiments, an uplink slot has a first predetermined duration, and a mini-slot has a second predetermined duration, which is smaller than said first predetermined duration. In some such embodiments, the second predetermined duration is an integer fraction of the first predetermined duration.

In some embodiments, step 510 includes one or both of steps 512 and step 514. In step 512 the UE receives information indicating the position of a gap and the duration of said gap in said received single UL grant message. In step 514 the UE receives information indicating sets of time and frequency resources to which the allocated slots and mini-slots correspond. Operation proceeds from step 510 to step 516.

In step 516 the UE recovers from the single UL grant message, from the base station, information communicating a scheduled combination of one or more uplink slots and at least one mini-slot which has been granted to the UE to use for uplink signaling. In some embodiments, step 516 includes one or both of steps 518 and 520. In step 518 the UE recovers from the received single UL grant message information indicating the position of said gap and duration of said gap. In step 520 the UE recovers from the received single UL grant message information indicating sets of time and frequency resources to which the allocated slots and mini-slots of the single grant correspond. Operation proceeds from step 516 to step 522. In some embodiments, operation may, and sometimes does, proceed from step 516 to step 530.

In step 522 the UE generates uplink signals to transmit on the the granted one or more slots and at least one mini-slot, which were granted to the UE in the received single UL grant message. Step 522 includes step 524, in which the UE includes UL traffic data and/or control information in the generated UL signals. In some embodiments, step 522 may, and sometimes does, includes step 526 in which the UE includes a null buffer status report (BSR), e.g., to indicate to the base station that the UE does not currently needs all of the allocated slots and/or mini-slots, which were previously allocated to the UE in the previously transmitted single UL grant message. Operation proceeds from step 522 to step 528, in which the UE transmits said generated uplink signals, e.g., of step 522, on the granted one or more slots and at least one mini-slot, e.g., of unlicensed spectrum.

Returning to step 530, in step 530, the UE generates an uplink signal communicating information indicating that the UE does not need at least some of the said granted slots and/or mini-slots. Operation proceeds from step 530 to step 532, in which the UE transmit to said base station said generated uplink signal communicating information indicating that the UE does not need at least some of the said granted slots and/or mini-slots, said signal being communicated using licensed spectrum.

Operation proceeds from step 528, and in some embodiments, from step 532, to step 504.

Figure 6:
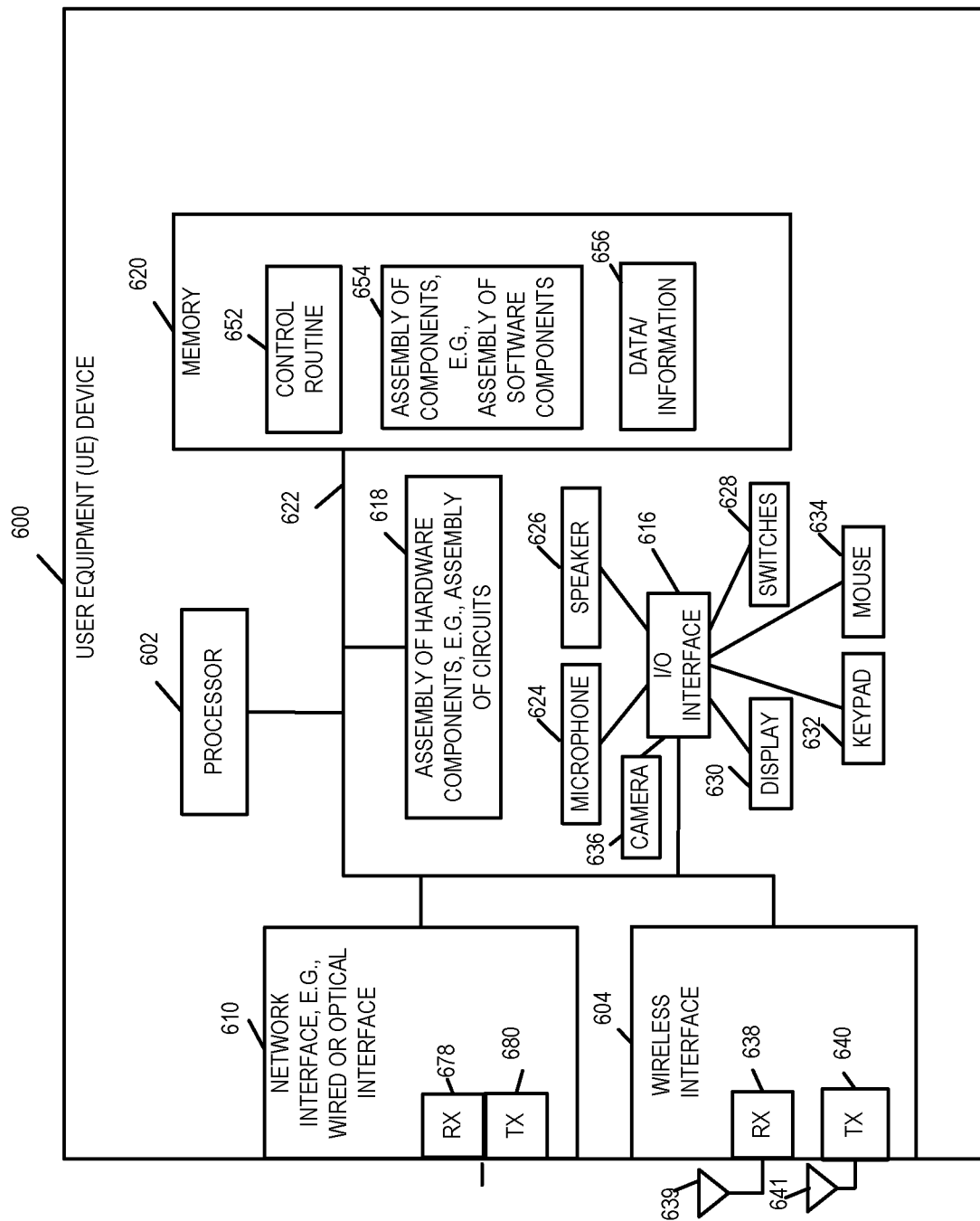
FIG. 6 is a drawing of an exemplary user equipment (UE) device implemented in accordance with an exemplary embodiment.

FIG. 6 is a drawing of an exemplary user equipment (UE) device 600 implemented in accordance with an exemplary embodiment. UE device 600 is, e.g. one of the UE devices (150, 152, 154, 156, 158, 160, 162, 164, 166, 168, 170, 172, 174, 176, 180, 182, 184, 186, 188) of system 100 of FIG. 1, e.g., UE 1A 150 of FIG. 1. UE device 600 includes a processor 602, a wireless interface 604, a network interface 610, an I/O interface 616, an assembly of hardware components 618, e.g., an assembly of circuits, and memory 620 coupled together via a bus 622 over which the various elements may interchange data and information. Wireless interface 604 includes a wireless receiver 638 coupled to receive antenna 639, via which the UE may receive wireless signals, e.g., wireless downlink signals from a base station, e.g., BS 1 102 of FIG. 1, e.g., a gNB. An exemplary signal received by wireless receiver 1238 is a signal communicating a single UL grant message from a base station which was communicated over unlicensed spectrum, said single UL grant message communicating information identifying a combination of one or more uplink slots and at least one mini-slot granted to the UE and optionally including gap and/or time/frequency information. Another exemplary wireless signal received by wireless receiver 638 is a signal communicating a single UL grant message from a base station which was communicated over unlicensed spectrum, said single UL grant message communicating a combination one or more uplink slots granted to the UE and one or more of i) information identifying a gap or ii) information identifying different set of time frequency resources corresponding to at least some different granted slots.

Wireless interface 604 includes a wireless transmitter 640 coupled to transmit antenna 1241, via which the UE may transmit wireless signals, e.g., wireless uplink signals to a base station, e.g., a gNB. Exemplary wireless signals transmitted by wireless transmitter 640, include, e.g., wireless uplink signals including traffic data and/or control information communicated over slots and/or mini-slots of unlicensed allocated to the UE in the received grant, a null buffer status report (BSR) communicated to the base station via one of the slots of mini-slots of the unlicensed spectrum which was allocated to the UE in the received grant, or an uplink message communicated to the base station via licensed spectrum, said uplink message informing the base station that the UE does not need all of the allocated slots and/or mini-slots granted to the UE in the grant and further identifying which slots and/or mini-slots will not be used by the UE. Network interface 610, e.g., a wired or optical interface 610 includes a receiver 678 and a transmitter 680.

UE device 600 further includes a microphone 624, a speaker 626, switches 628, a mouse 634, a keypad 632, a display 630 and a camera 636 coupled to I/O interface 616, via which the various input/output devices (624, 626, 628, 630, 632, 634, 636) may communicate with the other elements (602, 604, 610, 618, 620) of the UE device. Memory 620 includes a control routine 652, an assembly of components 654, e.g., an assembly of software components, and data/information 656.

Figure 7:
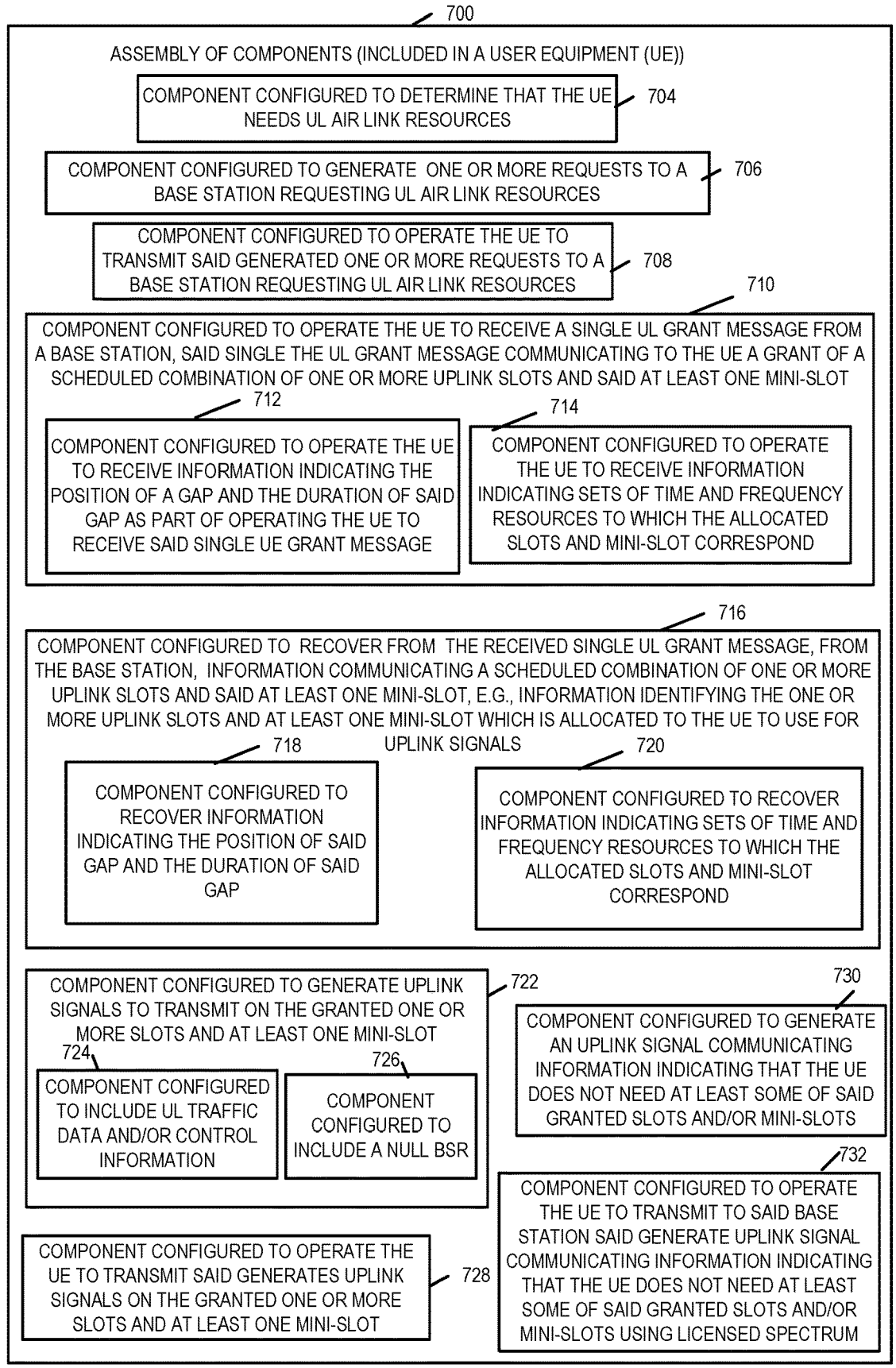
FIG. 7 is a drawing of an exemplary assembly of components which may be, and sometimes is, included in a user equipment (UE) device in accordance with an exemplary embodiment.

FIG. 7 is a drawing of an exemplary assembly of components 700 in accordance with an exemplary embodiment.

Exemplary assembly of components 700, which may be, and sometimes is, included in a user equipment (UE), such as the exemplary UE 600 of FIG. 6 and/or a UE of system 100 of FIG. 1 e.g., UE 1A 150 of FIG. 1, implements steps of an exemplary method, e.g., steps of the method of the flowchart 500 of FIG. 5.

Assembly of components 500 can be, and in some embodiments is, used in UE 600, e.g., of FIG. 6, UE 1A 150 of FIG. 1, or any of the other UEs of FIG. 1. The components in the assembly of components 700 can, and in some embodiments are, implemented fully in hardware within the processor 602, e.g., as individual circuits. The components in the assembly of components 700 can, and in some embodiments are, implemented fully in hardware within the assembly of components 618, e.g., as individual circuits corresponding to the different components. In other embodiments some of the components are implemented, e.g., as circuits, within the processor 602 with other components being implemented, e.g., as circuits within assembly of components 618, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 620 of the UE 600, with the components controlling operation of the UE to implement the functions corresponding to the components when the components are executed by a processor, e.g., processor 602. In some such embodiments, the assembly of components 700 is included in the memory 620 as assembly of components 654. In still other embodiments, various components in assembly of components 700 are implemented as a combination of hardware and software, e.g., with another circuit external to the processor 602 providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 700 is stored in the memory 620, the memory 620 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the UE 600, or elements therein such as the processor 602, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of the method of flowchart 500 of FIG. 5 and/or described or shown with respect to any of the other figures.

Assembly of components 700 includes a component 704 configured to determine that the UE needs UL needs UL air link resources, a component 706 configured to generate one or more requests to a base station requesting UL air link resources, and a component 708 configured to operate the UE to transmit said generated one or more requests to a base station requesting UL air link resources. Assembly of components 700 further includes a component 710 configured to operate the UE to receive a single UL grant message from a base station, said single UL grant message communicating to the UE a grant of a scheduled combination of one or more uplink slots and said at least one mini-slot. Component 710 includes a component 712 configured to operate the UE to receive information indicating the position of a gap and the duration of said pap as part of operating the UE to receive said single UL grant message, and a component 714 configured to operate the UE to receive information indicating sets of time and frequency resources to which the allocated slots and mini-slots correspond.

Assembly of components 700 further includes a component 716 configured to recover from the received single UL grant message, from the base station, information communicating a scheduled combination of one or more uplink slots and said at least one mini-slot, e.g., information identifying the one or more uplink slots and at least one mini-slot which is allocated to the UE to use for uplink signals. Component 716 includes a component 718 configured to recover information, e.g., from said received single UL grant message, indicating the position of said gap and the duration of said gap, and a component 720 configured to recover information, e.g., from said received single UL grant message, indicating sets of time and frequency resources to which the allocated slots and mini-slots correspond.

Assembly of components 700 further includes a component 722 configured to generate uplink signals to transmit on the granted one or more slots and at least one mini-slot allocated to the UE in the received single UL grant. Component 722 includes a component 724 configured to include UL traffic data and/or control information in the generated uplink signals, and a component 726 configured to include a null buffer status report in the uplink signals. In some embodiments, the inclusion of a null BSR is used to indicate to the base station that the UE does not currently need subsequent slots and subsequent mini-slots which have been granted to the UE in the previously received single UL grant. Assembly of components 700 further includes a component 728 configured to operate the UE to transmit the generated uplink signals, e.g., from component 722, using the granted one or more slots and at least one mini-slot. In some embodiments, component 728 controls the UE to send the generated uplink signals using unlicensed spectrum, e.g., the granted one or more slots and at least one mini-slot correspond to unlicensed spectrum.

Assembly of components 700 further includes a component 730 configured to generate an uplink signal communicating information indicating that the UE does not need at least some of said granted slots and/or mini-slots and a component 732 configured to operate the UE to transmit to said base station said generated uplink signal communicating information indicating that the UE does not need at least some of said granted slots and/or mini-slots using licensed spectrum. In some such embodiments, the generated uplink signal communicating information indicating that the UE does not need at least some of said granted slots and/or mini-slots using licensed spectrum further conveys information indicating which particular slots and/or mini-slots are not needed, e.g., information indicating that the last slot (slot 4) and last mini-slot (end mini-slot) in a sequence of slots and mini-slots, e.g., sequence of slots (initial mini-slot, slot 1, slot 2, slot 3, slot 4, end mini-slot), allocated to the UE in the previously received single UL grant are no longer needed by the UE.

In some embodiments, a single UL grant sent in Downlink Control Information (DCI) is able to schedule PUSCH transmissions over X slots, but the slots need not be contiguous in time, In other words, a base station, e.g. a gNB, is able to schedule multi-slot PUSCH transmissions with one or more gaps in between the PUSCH slots. One use of indicating gaps is to enable fast UL-DL-UL switching with a singe UE grant without the need for Listen-BeforeOTalk (LBT), as shown in the example of FIG. 8 with X=3 and a gap after two PUSCH transmissions.

Figure 8:
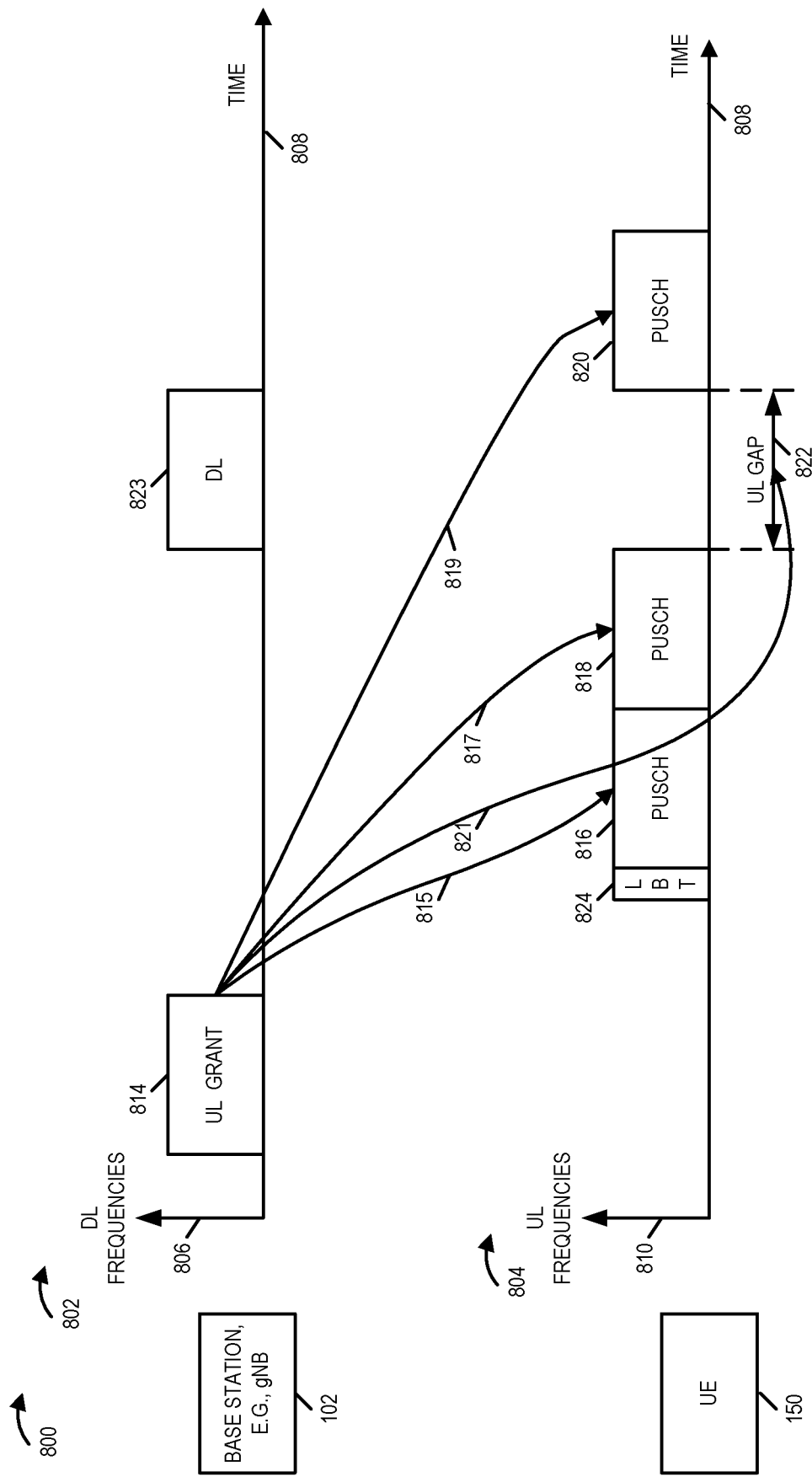
FIG. 8 is a drawing illustrating an example in which a single UL grant, sent in Downlink Control Information (DCI), schedules Physical Uplink Shared Channel (PUSCH) transmissions over three slots, and the slots are not contiguous, as there is a gap, in accordance with an exemplary embodiment.

FIG. 8 is a drawing 800 illustrating an example in which a single UL grant, sent in Downlink Control Information (DCI), schedules PUSCH transmissions over three slots, and the slots are not contiguous, as there is a gap. Drawing 800 of FIG. 8 includes drawing 802 which is a plot of downlink (DL) frequencies on vertical axis 806 vs time on horizontal axis 808 and a drawing 804 which is a plot of uplink (UL) frequencies on vertical axis 810 vs time on horizontal axis 808. Base station 102, e.g., a gNB, generates and transmits single UL grant 814, to UE 150, said single UL grant conveying information granting first slot Physcial Uplink Shared Channel (PUSCH) resources 816, second slot PUSCH resources 818, and third slot PUSCH resources 820, to UL 150 to use for uplink transmissions, as indicated by arrows (815, 817, and 819). The single UL grant 814 also conveys information, as indicated by arrow 821, indicating that there is UL gap 822, between resources 818 and 820. In this example, during gap 822, the base station 102 transmits downlink signals as indicated by block 823, e.g., downlink signals directed to UE 150. In this example, UE 150 performs a Listen Before Talk (LBT) procedure before transmitting in the granted first PUSCH slot resource 816, as indicated by block 824, e.g. because there is a time delay exceeding a predetermined threshold for LBT between the end of UL grant downlink transmission 814 and the start of the PUSCH 816; however, the UE 150 does not need to perform additional LBTs before transmitting using each of the other allocate PUSCH resources (818 and 820). In some embodiments, the DL and UL frequencies used in the example of FIG. 8 correspond to unlicensed spectrum, e.g., NR unlicensed spectrum.

In some embodiments, a single UL grant sent in Downlink Control Information (DCI) is able to schedule PUSCH transmission over X slots, but the PUSCH transmissions nedd not have the same frequency-domain resource allocation. In other words the base station, e.g., gNB is able to schedule multi-slot PUSCH transmissions with different frequency-domain resources or interlaces in each slot. This can be beneficial for dynamic bandwidth adaptation and wideband carrier operation, as shown in the example of FIG. 9, where X=2.

Figure 9:
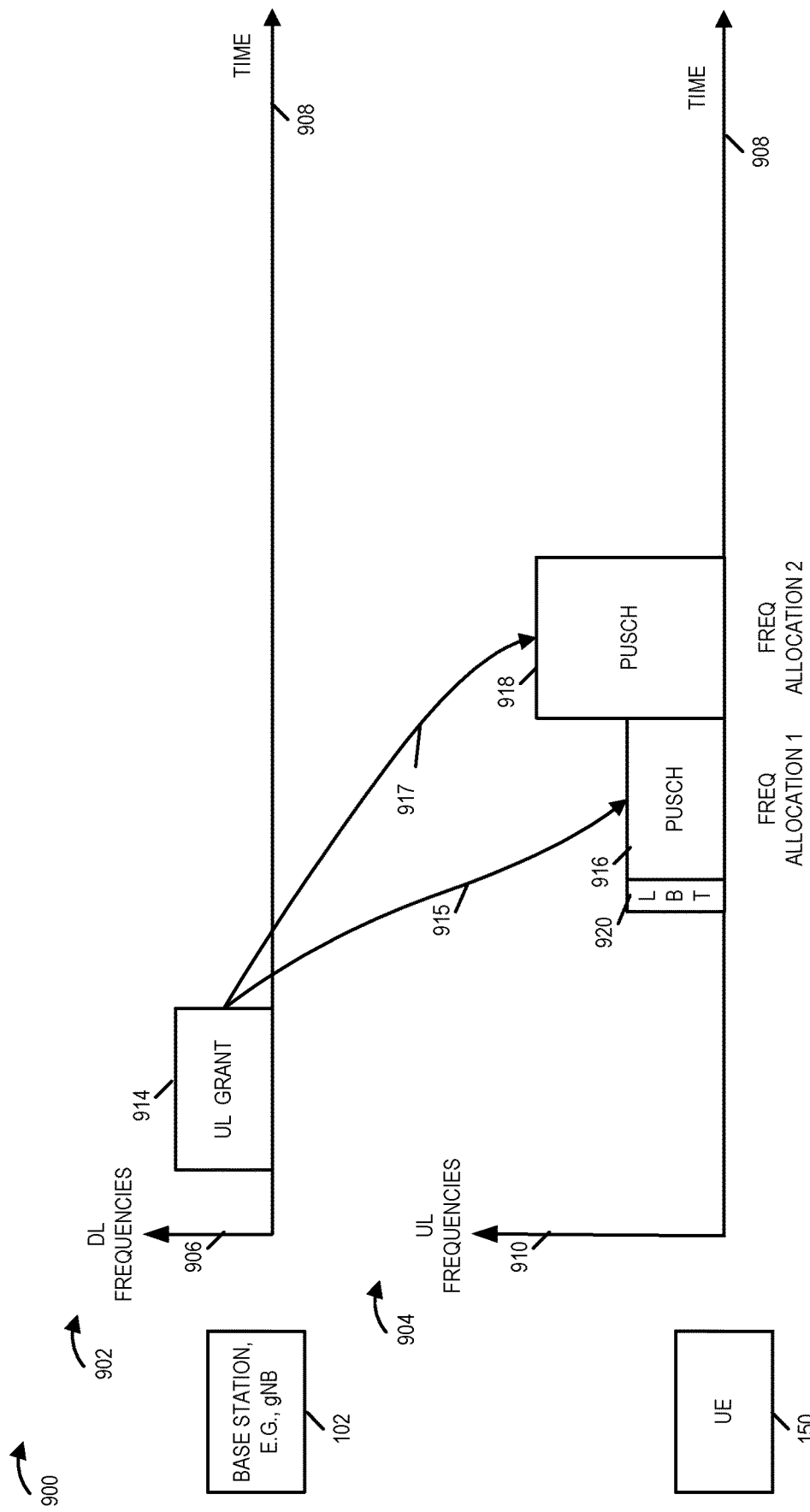
FIG. 9 is a drawing illustrating an example in which a single UL grant, sent in Downlink Control Information (DCI), schedules PUSCH transmissions over two slots, with different frequency domain resources, in accordance with an exemplary embodiment.

FIG. 9 is a drawing 900 illustrating an example in which a single UL grant, sent in Downlink Control Information (DCI), schedules PUSCH transmissions over two slots, with different frequency domain resources. Drawing 900 of FIG. 9 includes drawing 902 which is a plot of downlink (DL) frequencies on vertical axis 906 vs time on horizontal axis 908 and a drawing 904 which is a plot of uplink (UL) frequencies on vertical axis 910 vs time on horizontal axis 908. Base station 102, e.g., a gNB, generates and transmits single UL grant 914, to UE 150, said single UL grant conveying information granting first slot Physcial Uplink Shared Channel (PUSCH) resources 916 and second slot PUSCH resources 918 to UL 150 to use for uplink transmissions, as indicated by arrows (915, 917). There is a first frequency allocation for PUSCH 1018 and there is a second frequency allocation for PUSCH 1020, and the frequency allocation information is communicated in the UL grant message 1014. It may be observed that PUSCH resource block 918 includes additional frequencies not included in PUSCH resource block 916. In this example, UE 150 performs a Listen Before Talk (LBT) procedure before transmitting in the granted first PUSCH slot resource 916, as indicated by block 920, e.g. because there is a time delay exceeding a predetermined threshold for LBT between the end of UL grant downlink transmission 914 and the start of the PUSCH 916; however, the UE 150 does not need to perform an additional LBT before transmitting using PUSCH resources 918. In some embodiments, the DL and UL frequencies used in the example of FIG. 9 correspond to unlicensed spectrum, e.g., NR unlicensed spectrum.

In some embodiments, a single UL grant sent in Downlink Control Information (DCI) is able to schedule PUSCH transmissions over X slots, but each slot may have different time-domain durations. In other words, a combination of slot-based (e.g., 14 symbols), and non-slot or mini-slot based (e.g., less than 14 symbols) PUSCH transmissions can be, and sometimes is, scheduled by the base station, e.g. gNB. This can be beneficial when the starting or enfing point of the PUSCH transmissions has to be truncated due to Listen Before Talk (LBT) failure or maximum channel occupancy time (MCOT) restrictions.

Figure 10:
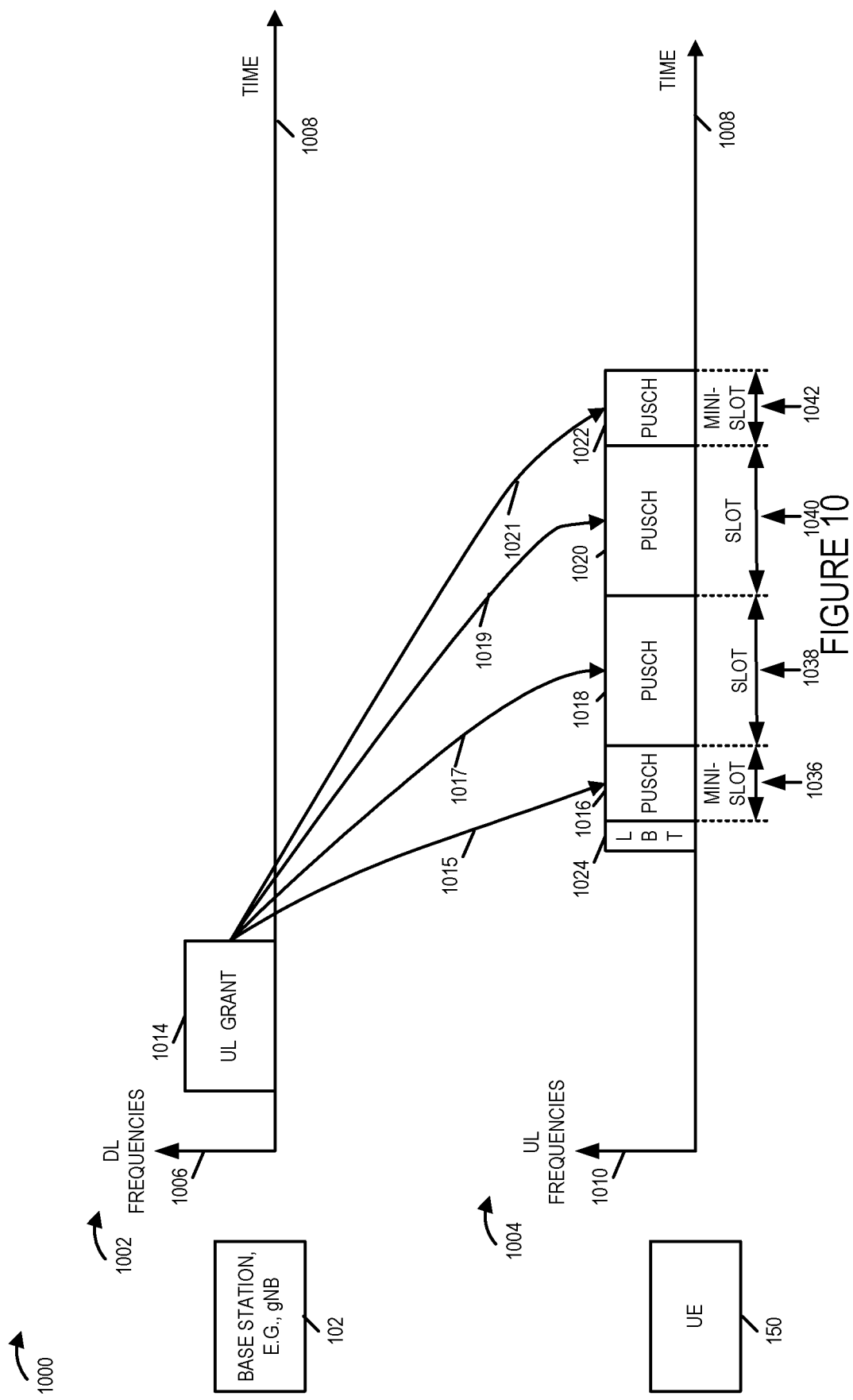
FIG. 10 is a drawing illustrating an example in which a single UL grant, sent in Downlink Control Information (DCI), schedules PUSCH transmissions over multiple slots and multiple mini-slots, in accordance with an exemplary embodiment.
Figure 11:
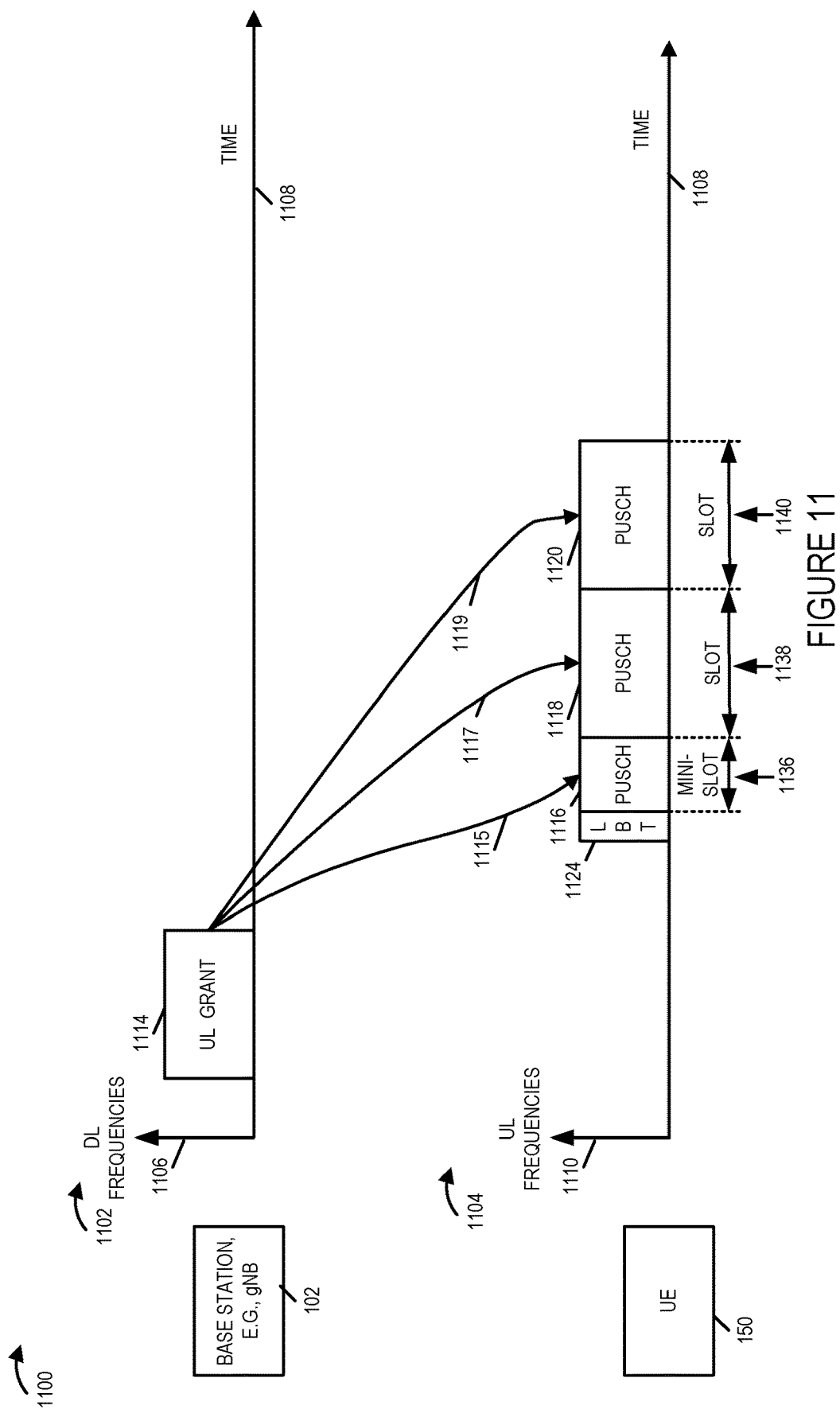
FIG. 11 is a drawing illustrating an example in which a single UL grant, sent in Downlink Control Information (DCI), schedules PUSCH transmissions over an initial mini-slot, and subsequent slots, in accordance with an exemplary embodiment.
Figure 12:
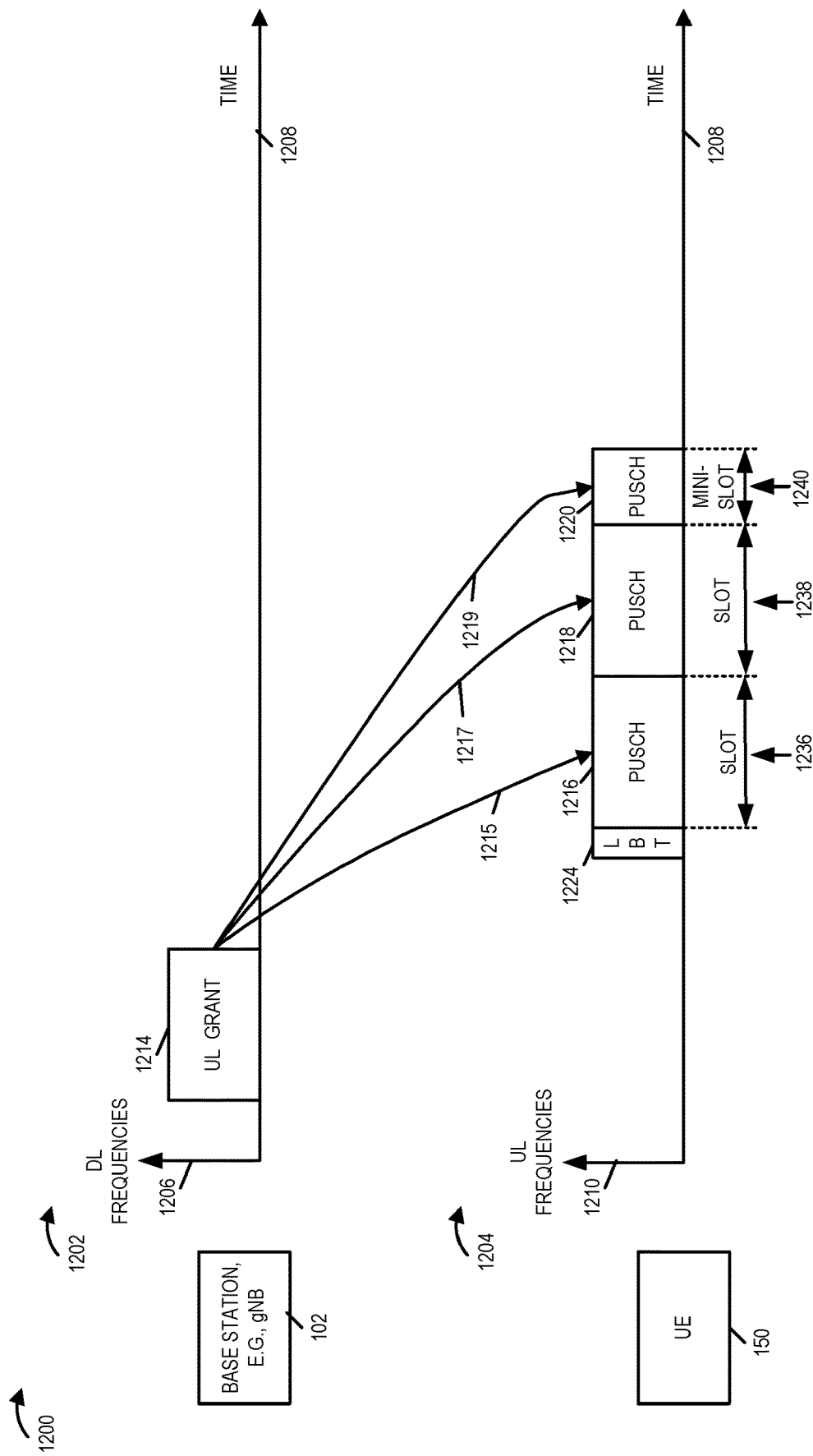
FIG. 12 is a drawing illustrating an example in which a single UL grant, sent in Downlink Control Information (DCI), schedules PUSCH transmissions over multiple slots and an end mini-slot.

As non-limiting examples, for X slots, the following alternatives are possible, and are implemented in some embodiments: i) the first and last slots are mini-slots, while other slots are full size (regular size) slots, or ii) the first slot is a mini-slot, while the other slots are full size (regular size) slots; or iii) the last slot is a mini-slot, while the other slots are full size (regular size) slots, as shown in the examples of FIGS. 10, 11, and 12, respectively, where X=4, X=3, and X=3, respectively.

FIG. 10 is a drawing 1000 illustrating an example in which a single UL grant, sent in Downlink Control Information (DCI), schedules PUSCH transmissions over the mini-slot 1036, slot 1038, slot 1040, and mini-slot 1042. Drawing 1000 of FIG. 10 includes drawing 1002 which is a plot of downlink (DL) frequencies on vertical axis 1006 vs time on horizontal axis 1008 and a drawing 1004 which is a plot of uplink (UL) frequencies on vertical axis 1010 vs time on horizontal axis 1008. Base station 102, e.g., a gNB, generates and transmits single UL grant 1014, to UE 150, said single UL grant conveying information granting first mini-slot Physical Uplink Shared Channel (PUSCH) resources 1016, first full size slot PUSCH resources 1018, second full size slot PUSCH resources 1020, and second mini-slot PUSCH resources 1122 to UL 150 to use for uplink transmissions, as indicated by arrows (1015, 1017, 1019, 1021), respectively. In the example of FIG. 10, the time duration of a mini-slot is ½ the time duration of a full size slot. In other embodiments, a mini-slot is a different size, e.g., 1/14, 2/14, 3/14, 4/14, 5/14, 6/14, the size of the full size slot. In some embodiments, there may be a plurality of different size mini-slots which may be, and sometimes are used, e.g., with the mini-slot size information, or type of mini-slot, being communicated in the UL grant. In this example, UE 150 performs a Listen Before Talk (LBT) procedure before transmitting in the granted first PUSCH resource 1016, as indicated by block 1024, e.g. because there is a time delay exceeding a predetermined threshold for LBT between the end of UL grant downlink transmission 1014 and the start of the PUSCH 1016; however, the UE 150 does not need to perform an additional LBT before transmitting using any of PUSCH resources 1018, 1020 or 1022. In some embodiments, the DL and UL frequencies used in the example of FIG. 10 correspond to unlicensed spectrum, e.g., NR unlicensed spectrum.

FIG. 11 is a drawing 1100 illustrating an example in which a single UL grant, sent in Downlink Control Information (DCI), schedules PUSCH transmissions over the mini-slot 1136, slot 1138, and slot 1140. Drawing 1100 of FIG. 11 includes drawing 1102 which is a plot of downlink (DL) frequencies on vertical axis 1106 vs time on horizontal axis 1108 and a drawing 1104 which is a plot of uplink (UL) frequencies on vertical axis 1110 vs time on horizontal axis 1108. Base station 102, e.g., a gNB, generates and transmits single UL grant 1114, to UE 150, said single UL grant conveying information granting first mini-slot Physcial Uplink Shared Channel (PUSCH) resources 1116, first full size slot PUSCH resources 1118, and second full size slot PUSCH resources 1120 to UL 150 to use for uplink transmissions, as indicated by arrows (1115, 1117, 1119), respectively. In the example of FIG. 11, the time duration of a mini-slot is ½ the time duration of a full size slot. In other embodiments, a mini-slot is a different size, e.g., $1/14$, $2/14$, $3/14$, $4/14$, $5/14$, $6/14$, the size of the full size slot. In some embodiments, there may be a plurality of different size mini-slots which may be, and sometimes are used, e.g., with the mini-slot size information, or type of mini-slot, being communicated in the UL grant. In this example, UE 150 performs a Listen Before Talk (LBT) procedure before transmitting in the granted first PUSCH resource 1116, as indicated by block 1124, e.g. because there is a time delay exceeding a predetermined threshold for LBT between the end of UL grant downlink transmission 1114 and the start of the PUSCH 1116; however, the UE 150 does not need to perform an additional LBT before transmitting using any of PUSCH resources 1118, or 1122. In some embodiments, the DL and UL frequencies used in the example of FIG. 11 correspond to unlicensed spectrum, e.g., NR unlicensed spectrum.

FIG. 12 is a drawing 1200 illustrating an example in which a single UL grant, sent in Downlink Control Information (DCI), schedules PUSCH transmissions slot 1236, slot 1238, and mini-slot 1240. Drawing 1200 of FIG. 12 includes drawing 1202 which is a plot of downlink (DL) frequencies on vertical axis 1206 vs time on horizontal axis 1208 and a drawing 1204 which is a plot of uplink (UL) frequencies on vertical axis 1210 vs time on horizontal axis 1208. Base station 102, e.g., a gNB, generates and transmits single UL grant 1214, to UE 150, said single UL grant conveying information granting first full size slot Physcial Uplink Shared Channel (PUSCH) resources 1216, second full size slot PUSCH resources 1218, and first mini-slot PUSCH resources 1220 to UL 150 to use for uplink transmissions, as indicated by arrows (1215, 1217, 1219), respectively. In the example of FIG. 12, the time duration of a mini-slot is ½ the time duration of a full size slot. In other embodiments, a mini-slot is a different size, e.g., $1/14$, $2/14$, $3/14$, $4/14$, $5/14$, $6/14$, the size of the full size slot. In some embodiments, there may be a plurality of different size mini-slots which may be, and sometimes are used, e.g., with the mini-slot size information, or type of mini-slot, being communicated in the UL grant. In this example, UE 150 performs a Listen Before Talk (LBT) procedure before transmitting in the granted first slot PUSCH resource 1116, as indicated by block 1224, e.g. because there is a time delay exceeding a predetermined threshold for LBT between the end of UL grant downlink transmission 1214 and the start of the PUSCH 1216; however, the UE 150 does not need to perform an additional LBT before transmitting using any of PUSCH resources 1218 or 1220. In some embodiments, the DL and UL frequencies used in the example of FIG. 12 correspond to unlicensed spectrum, e.g., NR unlicensed spectrum.

In some embodiments, if a UE receives a multi-TTI grant of X slots and finds that it can empty its UL buffer in fewer slots than X (e.g., X−2 or X−1 slots), it may, and sometimes does, indicate to the base station, e.g. gNB, that it does not require the full allocation of X slots. As non-limiting examples, this indication may be, and sometimes is, sent on licensed carrier, or may take the form of a null buffer status report (BSR) in the last slot containing PUSCH signals from the UE. Upon receiving such an indication, the base station, e.g., gNB, may, and sometimes does, re-allocate the excess resources to another UE.

Figure 13:
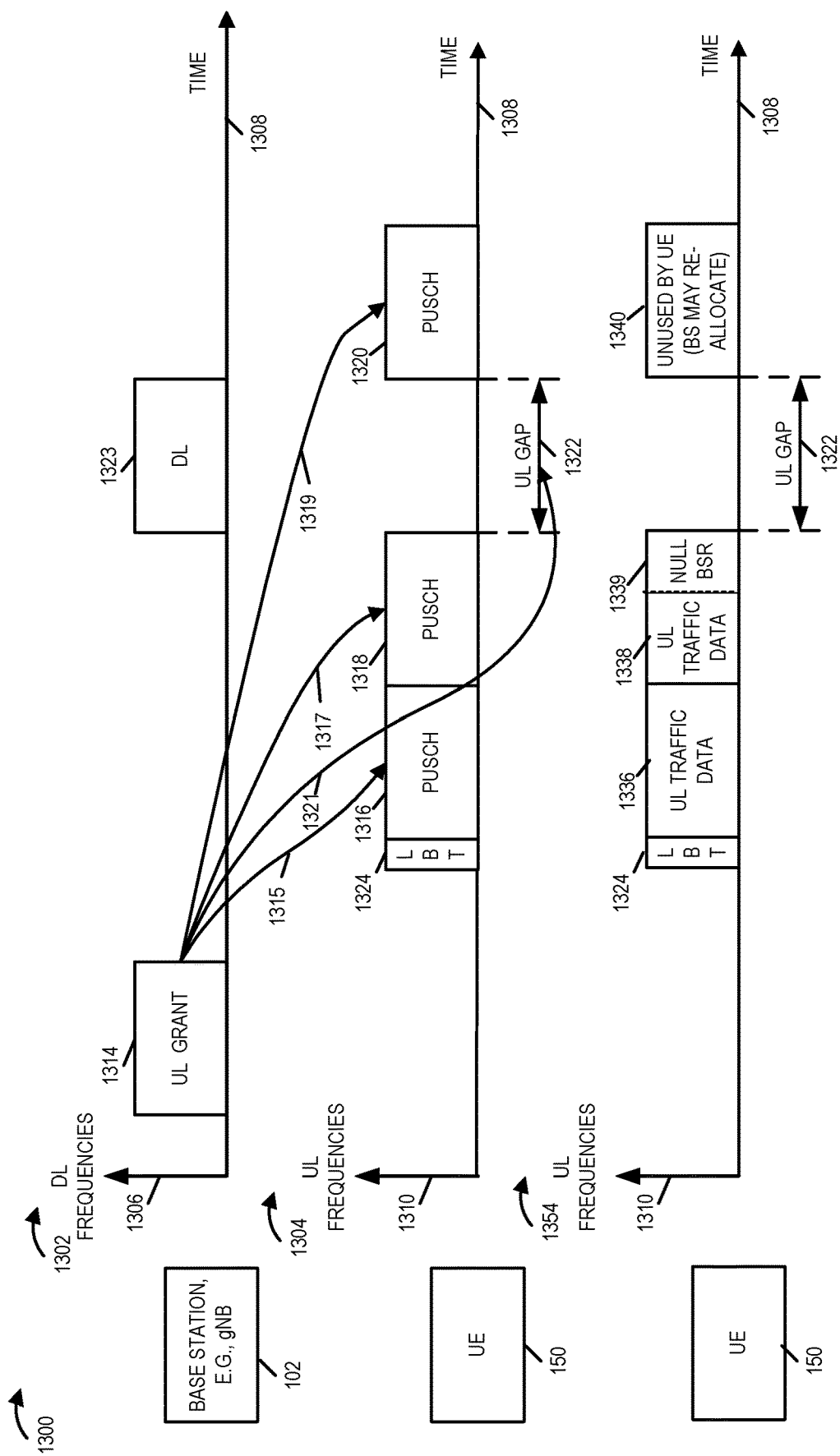
FIG. 13 is a drawing illustrating an example in which a single UL grant, sent in Downlink Control Information (DCI), schedules PUSCH transmissions over three slots, and the slots are not contiguous, as there is a gap; and the UE determines that it does not need the full allocation and communicates a null buffer status report (BSR) to the base station allowing the base station to re-allocate unused previously allocated resources, in accordance with an exemplary embodiment.

FIG. 13 is a drawing 1300 illustrating an example in which a single UL grant, sent in Downlink Control Information (DCI), schedules PUSCH transmissions over three slots, and the slots are not contiguous, as there is a gap; and the UE determines that it does not need the full allocation, and the UE communicates a null BSR to the base station allowing the base station to re-allocate unused previously allocated resources. Drawing 1300 of FIG. 13 includes drawing 1302 which is a plot of downlink (DL) frequencies on vertical axis 1306 vs time on horizontal axis 1308 and a drawing 1304 which is a plot of uplink (UL) frequencies on vertical axis 1310 vs time on horizontal axis 1308. Base station 102, e.g., a gNB, generates and transmits single UL grant 1314, to UE 150, said single UL grant conveying information granting first slot Physcial Uplink Shared Channel (PUSCH) resources 1316, second slot PUSCH resources 1318, and third slot PUSCH resources 1320, to UL 150 to use for uplink transmissions, as indicated by arrows (1315, 1317, and 1319). The single UL grant 1314 also conveys information, as indicated by arrow 1321, indicating that there is UL gap 1322, between resources 1318 and 1320. In this example, during gap 1322, the base station 102 transmits downlink signals as indicated by block 1323, e.g., downlink signals directed to UE 150. In this example, UE 150 performs a Listen Before Talk (LBT) procedure before transmitting in the granted first PUSCH slot resource 1316, as indicated by block 1324, e.g. because there is a time delay exceeding a predetermined threshold for LBT between the end of UL grant downlink transmission 1314 and the start of the PUSCH 1316; however, the UE 150 does not need to perform additional LBTs before transmitting using each of the other allocate PUSCH resources (1318 and 1320). In some embodiments, the DL and UL frequencies used in the example of FIG. 13 correspond to unlicensed spectrum, e.g., NR unlicensed spectrum.

Drawing 1300 further includes drawing 1354 which is a plot of uplink (UL) frequencies on vertical axis 1310 vs time on horizontal axis 1308, which is used to illustrate exemplary UE uplink signaling on the granted UL resources. In this example consider that UE 150 determines that is does not need the full allocation of 3 PUSCH resource blocks, but only requires less than 2 resource PUSCH resource blocks to empty its UL buffer. UE 150 transmits uplink signals including uplink traffic signals in first PUSCH resource block 1316, as indicated by block 1336. UE 150 transmits uplink signals including uplink traffic signals in second PUSCH resource block 1318, as indicated by block 1338; in addition, in second resource block 1316 UE 150 transmits a null buffer status report (BSR), as indicated by block 1339. Base station 102 receives the transmitted null BSR and determines that UE 150 does not need the resources corresponding to previously granted PUSCH resource block 1320. Base station 102 may, and sometimes does, re-allocate PUSCH 1320 to another UE, e.g. UE 152. Block 1340 in drawing 1354, indicates that UE 150 has relinquished previously granted PUSCH resource block 1320, and PUSCH resource block 1320 is not being used by UE 150 for uplink signaling.

Figure 14:
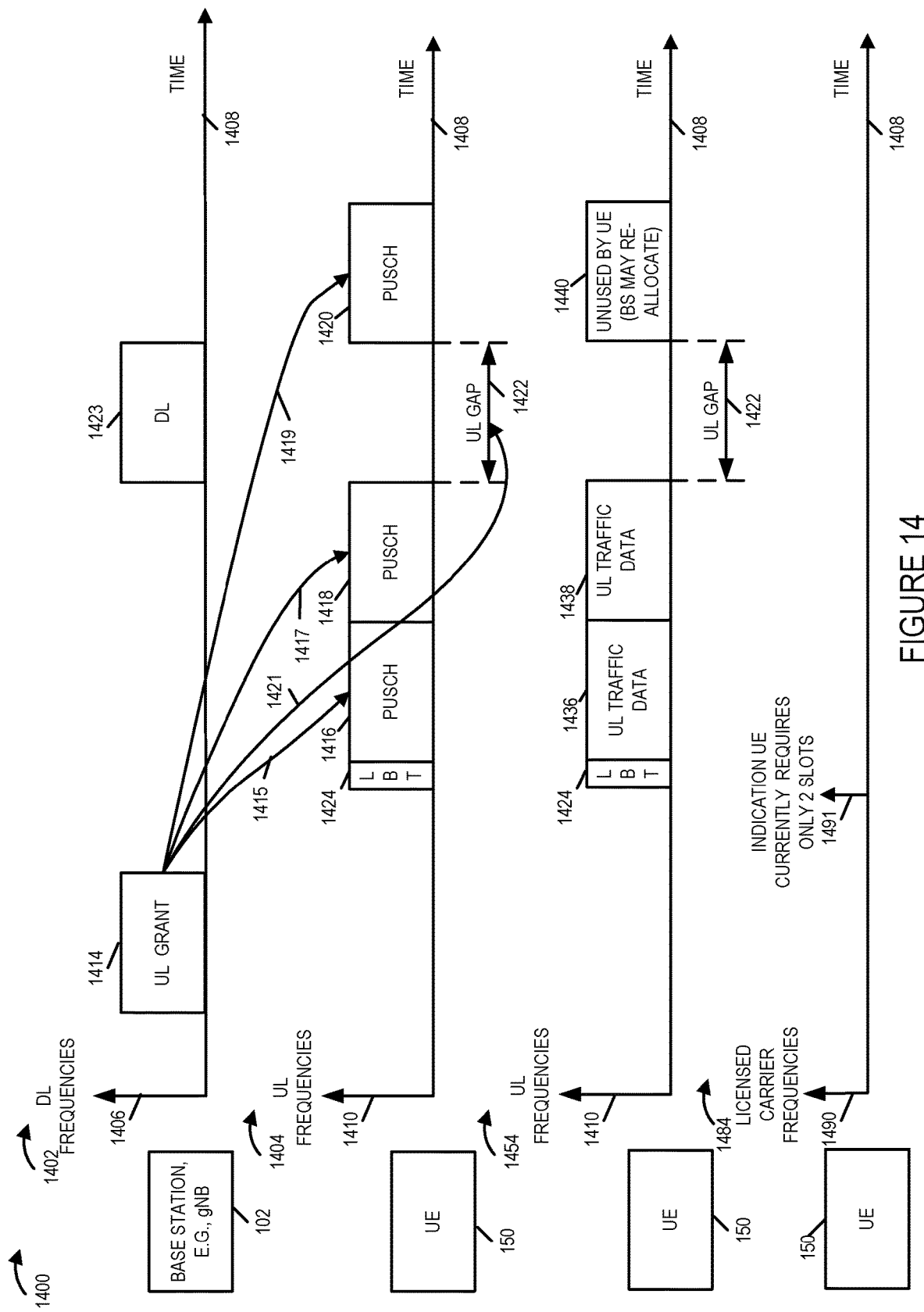
FIG. 14 is a drawing illustrating an example in which a single UL grant, sent in Downlink Control Information (DCI), schedules PUSCH transmissions over three slots, and the slots are not contiguous, as there is a gap; and the UE determines that it does not need the full allocation and communicates a signal in licensed spectrum to the base station indicating the UE does not need the full set of allocated resources, thus allowing the base station to re-allocate unused previously allocated resources.

FIG. 14 is a drawing 1400 illustrating an example in which a single UL grant, sent in Downlink Control Information (DCI), schedules PUSCH transmissions over three slots, and the slots are not contiguous, as there is a gap; and the UE determines that it does not need the full allocation, and the UE communicates a signal in licensed spectrum to the base station indicating the UE does not need the full set of allocated resources, thus allowing the base station to re-allocate unused previously allocated resources. Drawing 1400 of FIG. 14 includes drawing 1402 which is a plot of downlink (DL) frequencies on vertical axis 1406 vs time on horizontal axis 1408 and a drawing 1404 which is a plot of uplink (UL) frequencies on vertical axis 1410 vs time on horizontal axis 1408. Base station 102, e.g., a gNB, generates and transmits single UL grant 1414, to UE 150, said single UL grant conveying information granting first slot Physical Uplink Shared Channel (PUSCH) resources 1416, second slot PUSCH resources 1418, and third slot PUSCH resources 1420, to UL 150 to use for uplink transmissions, as indicated by arrows (1415, 1417, and 1419). The single UL grant 1414 also conveys information, as indicated by arrow 1421, indicating that there is UL gap 1422, between resources 1418 and 1420. In this example, during gap 1422, the base station 102 transmits downlink signals as indicated by block 1423, e.g., downlink signals directed to UE 150. In this example, UE 150 performs a Listen Before Talk (LBT) procedure before transmitting in the granted first PUSCH slot resource 1416, as indicated by block 1424, e.g. because there is a time delay exceeding a predetermined threshold for LBT between the end of UL grant downlink transmission 1414 and the start of the PUSCH 1416; however, the UE 150 does not need to perform additional LBTs before transmitting using each of the other allocate PUSCH resources (1418 and 1420). In some embodiments, the DL and UL frequencies used in the example of FIG. 14 correspond to unlicensed spectrum, e.g., NR unlicensed spectrum.

Drawing 1400 further includes drawing 1454 which is a plot of uplink (UL) frequencies on vertical axis 1410 vs time on horizontal axis 1408, which is used to illustrate exemplary UE uplink signaling on the granted UL resources. In this example consider that UE 150 determines that is does not need the full allocation of 3 PUSCH resource blocks, but requires at most 2 resource PUSCH resource blocks to empty its UL buffer. UE 150 transmits uplink signals including uplink traffic signals in first PUSCH resource block 1416, as indicated by block 1436. UE 150 transmits uplink signals including uplink traffic signals in second PUSCH resource block 1418, as indicated by block 1438. Block 1440 in drawing 1454, indicates that UE 150 has relinquished previously granted PUSCH resource block 1420, and PUSCH resource block 1420 is not being used by UE 150 for uplink signaling.

Drawing 1400 further includes drawing 1484 which is a plot of licensed carrier frequencies on vertical axis 1490 vs time on horizontal axis 1408, which is used to illustrate exemplary an exemplary UE uplink control signal in licensed spectrum. In the example of FIG. 14, UE 150 has determined, at some point in time after receiving UL grant 1414, the UE 150 does not need all of the UL resources which were communicated in the grant 1414. UE 150 determines that it does not need PUSCH resource block 1420. UE 150 generates and transmits uplink control signal 1491 to base station 102 in licensed spectrum, said control signal 1491 indicating that UE 150 only needs 2 PUSCH slots of resources and that PUSCH resource block 1420 is not needed by UE 150 and UE 150 will not transmit using PUSCH resource block 1420.

Base station 102 receives the transmitted control signal 1491, recovers the communicated information and determines that UE 150 does not need the resources corresponding to previously granted PUSCH resource block 1420. Base station 102 may, and sometimes does, re-allocate PUSCH 1420 to another UE, e.g. UE 152.

Figure 15:
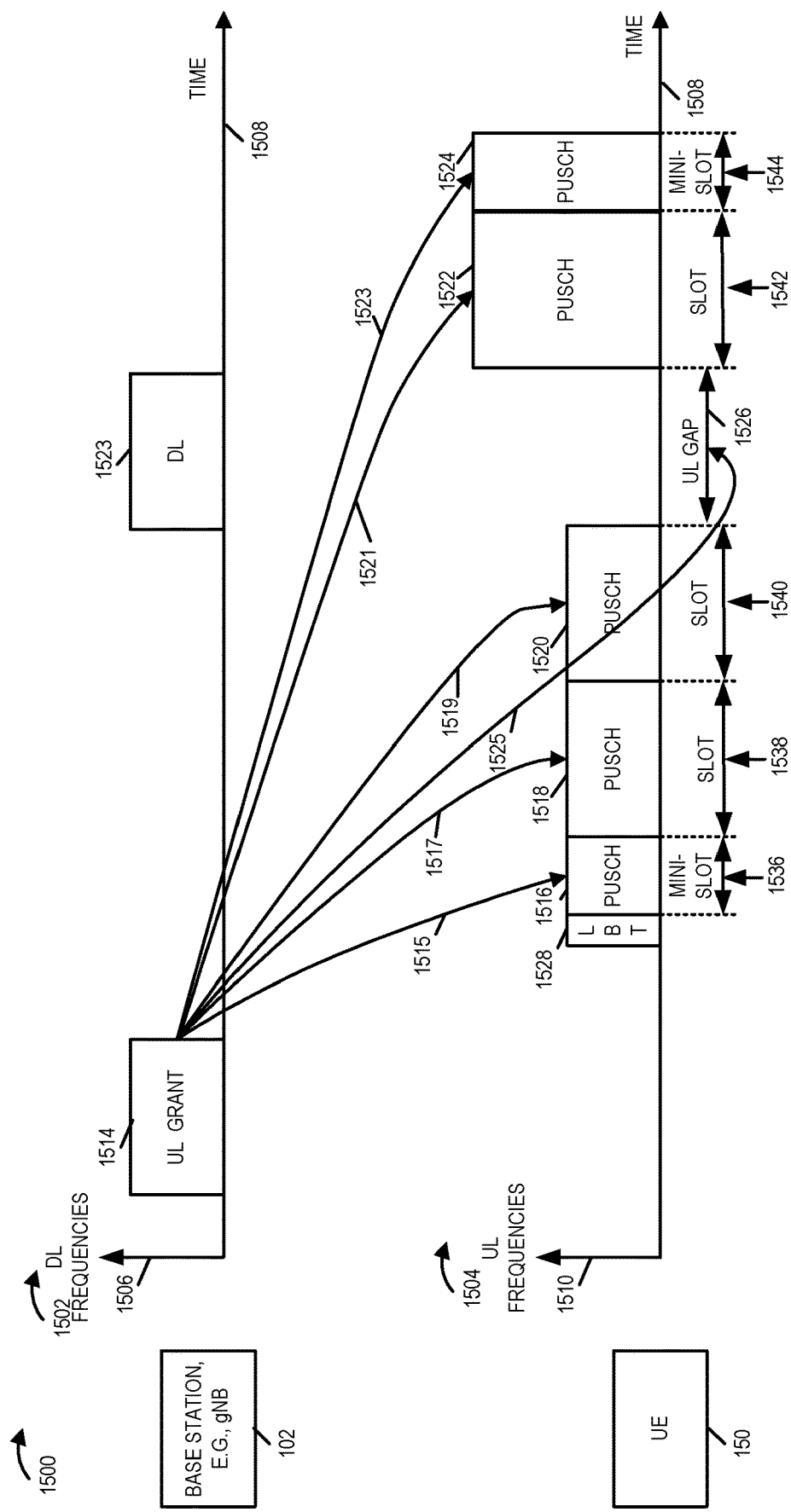
FIG. 15 is a drawing illustrating an example in which a single UL grant, sent in Downlink Control Information (DCI), schedules PUSCH transmissions corresponding to multiple mini-slots and multiple slots, wherein there is a gap between two of the slots, and wherein at least some or the multiple slots or mini-slots correspond to different sets of frequencies, in accordance with an exemplary embodiment.

FIG. 15 is a drawing 1500 illustrating an example in which a single UL grant, sent in Downlink Control Information (DCI), schedules PUSCH transmissions over the mini-slot 1536, slot 1538, slot 1540, slot 1542, and mini-slot 1544. Drawing 1500 of FIG. 15 includes drawing 1502 which is a plot of downlink (DL) frequencies on vertical axis 1506 vs time on horizontal axis 1508 and a drawing 1504 which is a plot of uplink (UL) frequencies on vertical axis 1510 vs time on horizontal axis 1508. Base station 102, e.g., a gNB, generates and transmits single UL grant 1514, to UE 150, said single UL grant conveying information granting first mini-slot Physical Uplink Shared Channel (PUSCH) resources 1016, first full size slot PUSCH resources 1518, second full size slot PUSCH resources 1520, third full size slot PUSCH resources 1522, and second mini-slot PUSCH resources 1524 to UL 150 to use for uplink transmissions, as indicated by arrows (1515, 1517, 1519, 1521. 1523), respectively. In the example of FIG. 15, the time duration of a mini-slot is ½ the time duration of a full size slot. In other embodiments, a mini-slot is a different size, e.g., $1/14$, $2/14$, $3/14$, $4/14$, $5/14$, $6/14$, the size of the full size slot. In some embodiments, there may be a plurality of different size mini-slots which may be, and sometimes are used, e.g., with the mini-slot size information, or type of mini-slot, being communicated in the UL grant.

In the example of FIG. 15, PUSCH resources (1516, 1518, and 1520) use a different set of frequencies than PUSCH resources (1522 and 1524), and the frequency use information is communicated in the UL grant 1514. The single UL grant 1514 also conveys information, as indicated by arrow 1521, indicating that there is UL gap 1526, between resources 1520 and 1522. In this example, during gap 1526, the base station 102 transmits downlink signals as indicated by block 1523, e.g., downlink signals directed to UE 150.

In this example, UE 150 performs a Listen Before Talk (LBT) procedure before transmitting in the granted first PUSCH resource 1516, as indicated by block 1528, e.g. because there is a time delay exceeding a predetermined threshold for LBT between the end of UL grant downlink transmission 1514 and the start of the PUSCH 1516; however, the UE 150 does not need to perform an additional LBT before transmitting using any of PUSCH resources 1518, 1520, 1522, or 1524. In some embodiments, the DL and UL frequencies used in the example of FIG. 15 correspond to unlicensed spectrum, e.g., NR unlicensed spectrum.

Figure 16:
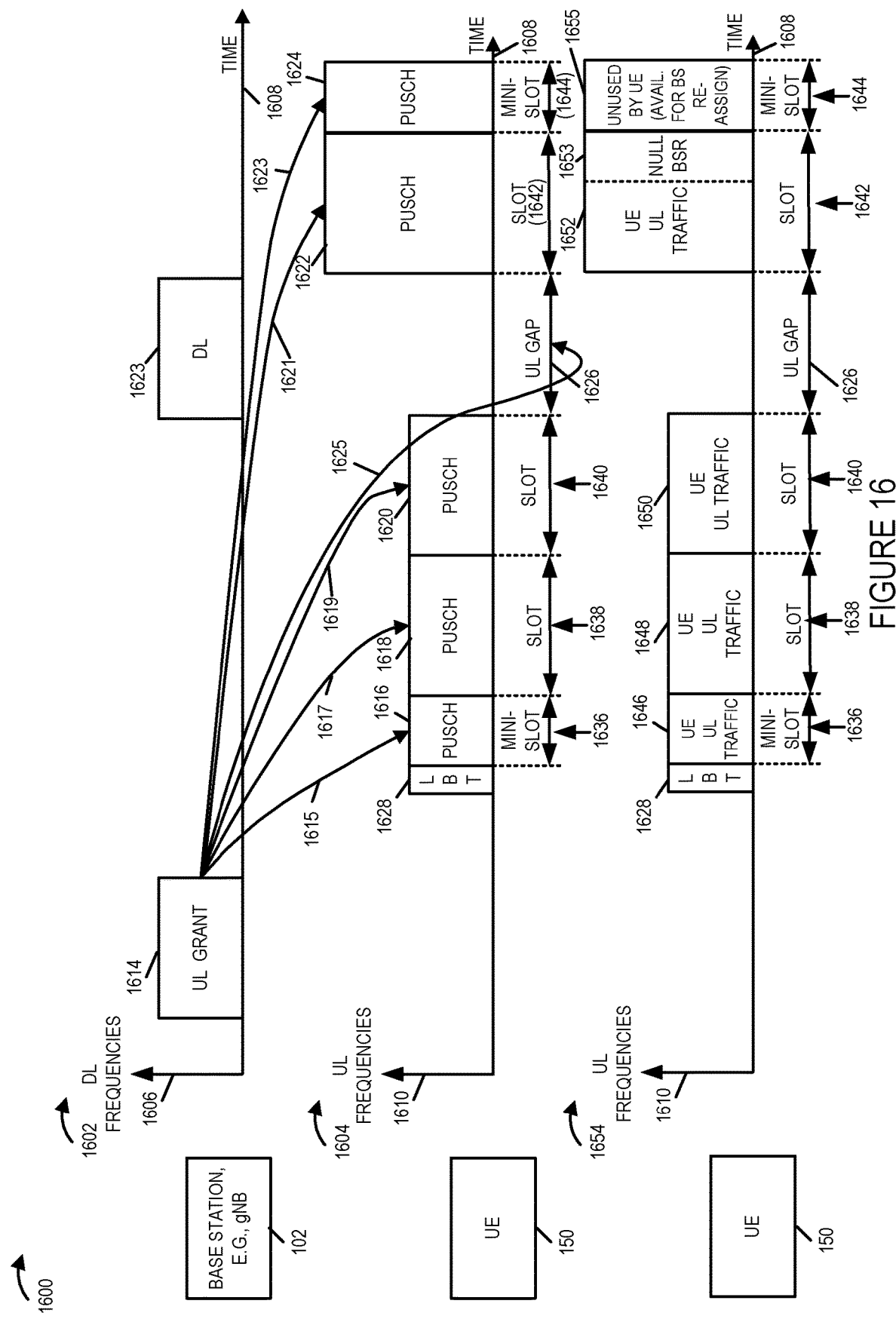
FIG. 16 illustrates an example in which a UE determines that it does not need the full allocation of UL resources which were granted to the UE in a received single UL grant, said single UL grant granting resources to the UE corresponding to multiple slots and multiple mini-slots; and the UE communicates a null buffer status report (BSR) to the base station in one of the granted resources allocated to the UE, thus communicating to the base station that its uplink buffer is empty and allowing the base station to re-allocate some of the previously allocated resources, which would otherwise go unused, to another UE.

FIG. 16 is a drawing 1600 illustrating an example in which a single UL grant, sent in Downlink Control Information (DCI), schedules PUSCH transmissions over the mini-slot 1636, slot 1638, slot 1640, slot 1642, and mini-slot 1644; and the UE determines that it does not need the full allocation, and the UE communicates a null BSR to the base station allowing the base station to re-allocate unused previously allocated resources. Drawing 1600 of FIG. 16 includes drawing 1602 which is a plot of downlink (DL) frequencies on vertical axis 1606 vs time on horizontal axis 1608 and a drawing 1604 which is a plot of uplink (UL) frequencies on vertical axis 1610 vs time on horizontal axis 1608. Base station 102, e.g., a gNB, generates and transmits single UL grant 1614, to UE 150, said single UL grant conveying information granting first mini-slot Physical Uplink Shared Channel (PUSCH) resources 1616, first full size slot PUSCH resources 1618, second full size slot PUSCH resources 1620, third full size slot PUSCH resources 1622, and second mini-slot PUSCH resources 1624 to UL 150 to use for uplink transmissions, as indicated by arrows (1615, 1617, 1619, 1621, 1623), respectively. In the example of FIG. 16, the time duration of a mini-slot is ½ the time duration of a full size slot. In other embodiments, a mini-slot is a different size, e.g., ¹⁄₁₄, ²⁄₁₄, ³⁄₁₄, ⁴⁄₁₄, ⁵⁄₁₄, ⁶⁄₁₄, the size of the full size slot. In some embodiments, there may be a plurality of different size mini-slots which may be, and sometimes are used, e.g., with the mini-slot size information, or type of mini-slot, being communicated in the UL grant.

In the example of FIG. 16, PUSCH resources (1616, 1618, and 1620) use a different set of frequencies than PUSCH resources (1622 and 1624), and the frequency use information is communicated in the UL grant 1614. The single UL grant 1614 also conveys information, as indicated by arrow 1621, indicating that there is UL gap 1626, between resources 1620 and 1622. In this example, during gap 1626, the base station 102 transmits downlink signals as indicated by block 1623, e.g., downlink signals directed to UE 150.

In this example, UE 150 performs a Listen Before Talk (LBT) procedure before transmitting in the granted first PUSCH resource 1616, as indicated by block 1628, e.g. because there is a time delay exceeding a predetermined threshold for LBT between the end of UL grant downlink transmission 1614 and the start of the PUSCH 1616; however, the UE 150 does not need to perform an additional LBT before transmitting using any of PUSCH resources 1618, 1620, 1622, or 1624. In some embodiments, the DL and UL frequencies used in the example of FIG. 16 correspond to unlicensed spectrum, e.g., NR unlicensed spectrum.

Drawing 1600 further includes drawing 1654 which is a plot of uplink (UL) frequencies on vertical axis 1610 vs time on horizontal axis 1608, which is used to illustrate exemplary UE uplink signaling on the granted UL resources. In this example consider that UE 150 determines that is does not need the full allocation of: mini-slot resource block 1616, full slot resource block 1618, full slot resource block 1620, full slot resource block 1622 and mini-slot resource block 1624, but only requires less than the combination of PUSCH resource blocks (1616, 1618, 1620 and 1622) to empty its UL buffer. UE 150 transmits uplink signals including uplink traffic signals in PUSCH resource block 1616, as indicated by block 1646. UE 150 transmits uplink signals including uplink traffic signals in PUSCH resource block 1618, as indicated by block 1648. UE 150 transmits uplink signals including uplink traffic signals in PUSCH resource block 1620, as indicated by block 1650. UE 150 transmits uplink signals including uplink traffic signals in PUSCH resource block 1622, as indicated by block 1652; in addition, in resource block 1622 UE 150 transmits a null buffer status report (BSR), as indicated by block 1653. Base station 102 receives the transmitted null BSR and determines that UE 150 does not need the resources corresponding to previously granted PUSCH resource block 624. Base station 102 may, and sometimes does, re-allocate PUSCH 1624 to another UE, e.g. UE 152. Block 1655 in drawing 1654, indicates that UE 150 has relinquished previously granted PUSCH resource block 1624, and PUSCH resource block 1624 is not being used by UE 150 for uplink signaling.

Figure 17:
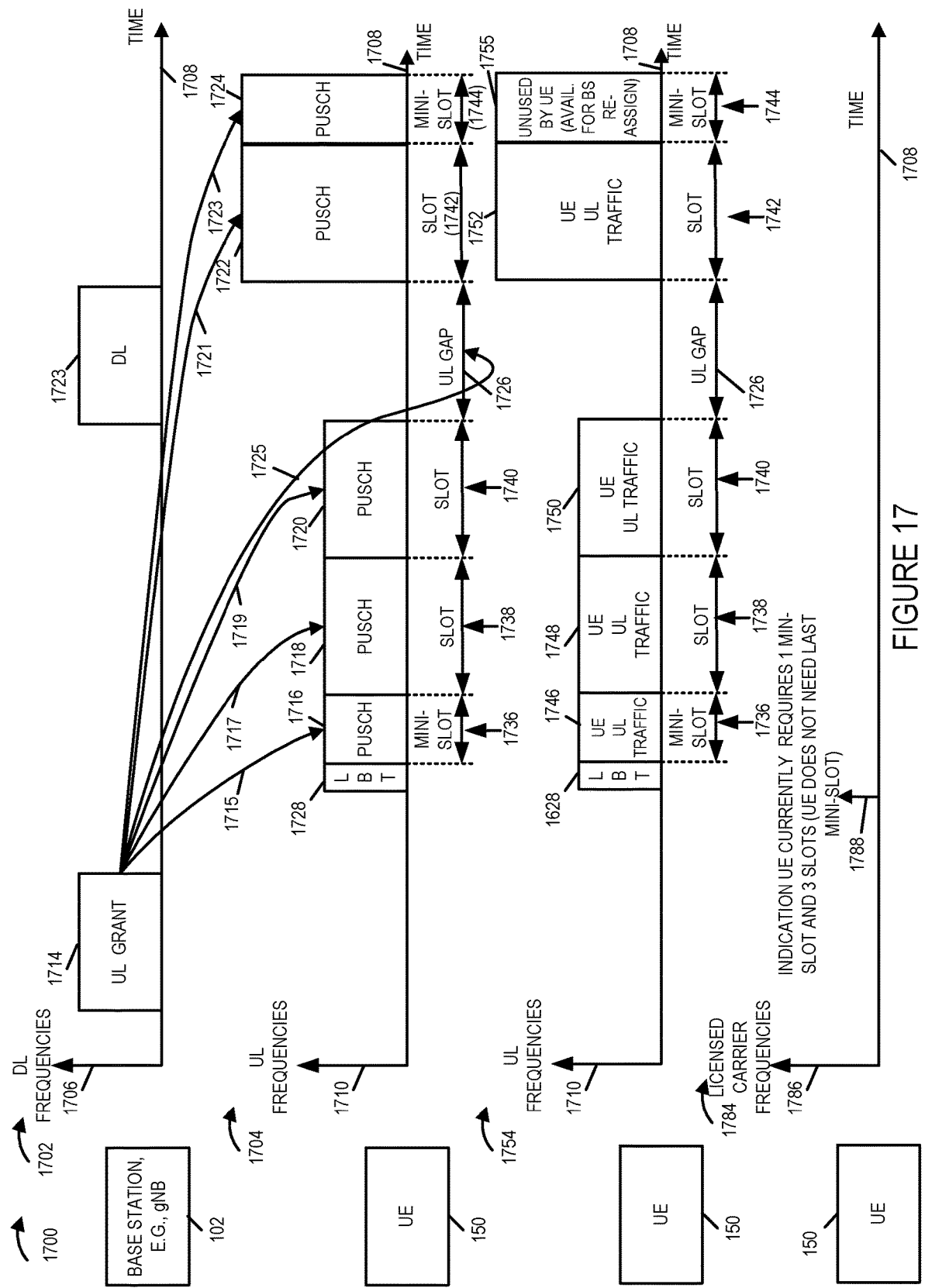
FIG. 17 illustrates an example in which a UE determines that it does not need the full allocation of UL resources which were granted to the UE in a received single UL grant, said single UL grant granting resources to the UE corresponding to multiple slots and multiple mini-slots; and the UE communicates a signal in licensed spectrum to the base station indicating the UE does not need the full set of allocated resources, thus allowing the base station to re-allocate unused previously allocated resources.

FIG. 17 is a drawing 1700 illustrating an example in which a single UL grant, sent in Downlink Control Information (DCI), schedules PUSCH transmissions over the mini-slot 1736, slot 1738, slot 1740, slot 1742, and mini-slot 1744; the UE determines that it does not need the full allocation, and the UE communicates a signal in licensed spectrum to the base station indicating the UE does not need the full set of allocated resources, thus allowing the base station to re-allocate unused previously allocated resources. Drawing 1700 of FIG. 17 includes drawing 1702 which is a plot of downlink (DL) frequencies on vertical axis 1706 vs time on horizontal axis 1708 and a drawing 1704 which is a plot of uplink (UL) frequencies on vertical axis 1710 vs time on horizontal axis 1708. Base station 102, e.g., a gNB, generates and transmits single UL grant 1714, to UE 150, said single UL grant conveying information granting first mini-slot Physcial Uplink Shared Channel (PUSCH) resources 1716, first full size slot PUSCH resources 1718, second full size slot PUSCH resources 1720, third full size slot PUSCH resources 1722, and second mini-slot PUSCH resources 1724 to UL 150 to use for uplink transmissions, as indicated by arrows (1715, 1717, 1719, 1721, 1723), respectively. In the example of FIG. 17, the time duration of a mini-slot is ½ the time duration of a full size slot. In other embodiments, a mini-slot is a different size, e.g., ¹⁄₁₄, ²⁄₁₄, ³⁄₁₄, ⁴⁄₁₄, ⁵⁄₁₄, ⁶⁄₁₄, the size of the full size slot. In some embodiments, there may be a plurality of different size mini-slots which may be, and sometimes are used, e.g., with the mini-slot size information, or type of mini-slot, being communicated in the UL grant.

In the example of FIG. 17, PUSCH resources (1716, 1718, and 1720) use a different set of frequencies than PUSCH resources (1722 and 1724), and the frequency use information is communicated in the UL grant 1714. The single UL grant 1714 also conveys information, as indicated by arrow 1721, indicating that there is UL gap 1726, between resources 1720 and 1722. In this example, during gap 1726, the base station 102 transmits downlink signals as indicated by block 1723, e.g., downlink signals directed to UE 150.

In this example, UE 150 performs a Listen Before Talk (LBT) procedure before transmitting in the granted first PUSCH resource 1716, as indicated by block 1728, e.g. because there is a time delay exceeding a predetermined threshold for LBT between the end of UL grant downlink transmission 1714 and the start of the PUSCH 1716; however, the UE 150 does not need to perform an additional LBT before transmitting using any of PUSCH resources 1718, 1720, 1722, or 1724. In some embodiments, the DL and UL frequencies used in the example of FIG. 17 correspond to unlicensed spectrum, e.g., NR unlicensed spectrum.

Drawing 1700 further includes drawing 1754 which is a plot of uplink (UL) frequencies on vertical axis 1710 vs time on horizontal axis 1608, which is used to illustrate exemplary UE uplink signaling on the granted UL resources. In this example consider that UE 150 determines that is does not need the full allocation of: mini-slot resource block 1716, full slot resource block 1718, full slot resource block

1720, full slot resource block 1722 and mini-slot resource block 1724, but only requires less than or equal to the combination of PUSCH resource blocks (1716, 1718, 1720 and 1722) to empty its UL buffer. UE 150 transmits uplink signals including uplink traffic signals in PUSCH resource block 1716, as indicated by block 1746. UE 150 transmits uplink signals including uplink traffic signals in PUSCH resource block 1718, as indicated by block 1748. UE 150 transmits uplink signals including uplink traffic signals in PUSCH resource block 1720, as indicated by block 1750. UE 150 transmits uplink signals including uplink traffic signals in PUSCH resource block 1722, as indicated by block 1752. Block 1755 in drawing 1754, indicates that UE 150 has relinquished previously granted PUSCH resource block 1724, and PUSCH resource block 1724 is not being used by UE 150 for uplink signaling.

Drawing 1700 further includes drawing 1784 which is a plot of licensed carrier frequencies on vertical axis 1786 vs time on horizontal axis 1708, which is used to illustrate exemplary uplink signaling in licensed spectrum including an exemplary UE uplink control signal 1788 in licensed spectrum. In the example of FIG. 17, UE 150 has determined, at some point in time after receiving UL grant 1714, that UE 150 does not need all of the UL resources which were communicated in the grant 1714. UE 150 determines that it does not need PUSCH resource block 1724. UE 150 generates and transmits uplink control signal 1788 to base station 102 in licensed spectrum, said control signal 1788 indicating that UE 150 only needs the initial PUSH mini-slot resources 1716 and the three full size slot PUSCH resources (1718, 1720, 1722) and that end mini-slot PUSCH resource block 1724 is not needed by UE 150 and UE 150 will not transmit using PUSCH resource block 1724.

Base station 102 receives the transmitted control signal 1788, recovers the communicated information and determines that UE 150 does not need the resources corresponding to previously granted PUSCH resource block 1724. Base station 102 may, and sometimes does, re-allocate PUSCH 1724 to another UE, e.g. UE 152.

Each of the described embodiments are applicable to dynamically scheduled UL transmissions, and may be, and sometimes, are used in dynamically scheduled UL transmissions.

Each of the described embodiments, are applicable to configured grant UL transmissions, and may be, and sometimes are, used in configured grant UL transmission.

While an UL grant may communicate a grant of a combination of full slots and mini-slots which maybe correspond to contiguous time slots separated by a gap, in at least some embodiments the UL grant is a grant of full slots but different time/frequency resources being granted for different slots and/or gaps between the slots for which resources are granted. Thus it should be appreciated that the features relating to granting a portion of a slot, e.g., a mini-slot, need not be used in all embodiments and the features relating to granting UL resources and/or resources with a gap between them can be used alone or in combination with the granting of one or more mini-slots. Accordingly, while various features are explained in the context of an example where a mini-slot is among the granted resources communicated in a single UL grant message, the granting of one or more mini-slots is not needed or used in all embodiments.

NUMBERED LIST OF EXEMPLARY METHOD EMBODIMENTS

Method Embodiment 1 A method of operating a base station (102), the method comprising: scheduling (204) a first user equipment (UE) for uplink transmission in a combination of one or more uplink slots and at least one mini-slot, said uplink slot having a first predetermined duration, said mini-slot having a second predetermined duration which is smaller than said first predetermined duration; and transmitting (212) a single UL grant message to the first UE communicating a grant of the scheduled combination of said one or more uplink slots and said at least one mini-slot.

Method Embodiment 2 The method of Method Embodiment 1, wherein said second predetermined duration is an integer fraction of said first predetermined duration.

Method Embodiment 3 The method of Method Embodiment 1, wherein said at least one mini-slot includes a plurality of mini-slots scheduled for use by the first UE.

Method Embodiment 4 The method of Method Embodiment 3, wherein said plurality of mini-slots includes a first mini-slot that precedes a first uplink slot scheduled for use by the first UE and a second mini-slot that follows said first uplink slot scheduled for use by the first UE.

Method Embodiment 5 The method of Method Embodiment 4, wherein said first UE is scheduled only full slots between said first mini-slot and said second mini-slot.

Method Embodiment 6 The method of Method Embodiment 1, wherein a gap in time exists between at least one of the one or more slots allocated to said first UE or an uplink slot and a mini-slot; and wherein transmitting (212) said single UL grant message to the first UE communicating a grant of the scheduled combination of one or more uplink slots and said at least one mini-slot includes: transmitting (214) information indicating the position of said gap and a duration of said gap to the first UE as part of said first grant message.

Method Embodiment 7 The method of Method Embodiment 6, wherein said gap is an integer multiple of said first predetermined duration.

Method Embodiment 8 The method of Method Embodiment 6, wherein said gap is indicated by indicating positions in a uplink timing structure of slots and mini-slots scheduled for use by the first user equipment (UE) or by indicating a continuous sequence of slots and mini-slots with the location of the gap in the contiguous slots being indicated in the grant message, or the location of the gap is indicated using a combination of the grant message and a channel occupancy structure indicated using a common control message.

While in some embodiments a single gap is indicated in other embodiments multiple gaps are indicated with each of the multiple gaps between the granted resources being indicated in the same or similar manner that a single gap is indicated.

Method Embodiment 9 The method of Method Embodiment 1, wherein said granted slots and mini-slots include slots which vary in time and frequency resource; and wherein the grant transmitted to the first UE includes information indicating sets of time and frequency resources to which the allocated slots and mini-slot correspond.

Method Embodiment 10 The method of Method Embodiment 1, further comprising: receiving (218) a signal from said first UE indicating that the first UE does not need at least some of the granted uplink slots or mini-slots.

Method Embodiment 11 The method of Method Embodiment 10, wherein receiving (218) a signal from said first UE indicating that the first UE does not need at least some of the granted uplink slots or mini-slots includes: receiving (220) a null buffer status report from said first UE in one of said granted UL slots or mini-slots.

Method Embodiment 12 The method of Method Embodiment 10, wherein receiving (218) a signal from said first UE indicating that the first UE does not need at least some of the granted uplink slots or mini-slots includes: receiving (222) a message in licensed spectrum from said first UE in licensed spectrum indicating that said first UE does not need at least some of the granted uplink slots or mini-slots.

Method Embodiment 13 The method of Method Embodiment 10, further comprising: re-allocating (224) resources (e.g., slots and/or mini-slots) which were previously granted to the first UE but are no longer needed by the first UE, to a second UE.

Method Embodiment 14 The method of claim 1, wherein said received single UL grant corresponds to configured grant UL transmissions (e.g., in accordance with a predetermined configured fixed timing structure).

Method Embodiment 15 The method of Method Embodiment 1, wherein said received single UL grant corresponds to dynamically scheduled uplink transmissions.

Method Embodiment 16 The method of Method Embodiment 1, wherein said received single UL grant is communicated in a Downlink Control Information (DCI) channel.

Method Embodiment 17 The method of Method Embodiment 1, wherein said one or more slots and said at least one mini-slot correspond to new radio unlicensed spectrum.

NUMBERED LIST OF EXEMPLARY APPARATUS EMBODIMENTS

Apparatus Embodiment 1 A base station (102) comprising: a processor (302) configured to: schedule (204) a first user equipment (UE) for uplink transmission in a combination of one or more uplink slots and at least one mini-slot, said uplink slot having a first predetermined duration, said mini-slot having a second predetermined duration which is smaller than said first predetermined duration; and operate the base station (e.g., control wireless transmitter 314) to transmit (212) a single UL grant message to the first UE communicating a grant of the scheduled combination of said one or more uplink slots and said at least one mini-slot.

Apparatus Embodiment 2 The base station of Apparatus Embodiment 1, wherein said second predetermined duration is an integer fraction of said first predetermined duration.

Apparatus Embodiment 3 The base station of Apparatus Embodiment 1, wherein said at least one mini-slot includes a plurality of mini-slots scheduled for use by the first UE.

Apparatus Embodiment 4 The base station of Apparatus Embodiment 3, wherein said plurality of mini-slots includes a first mini-slot that precedes a first uplink slot scheduled for use by the first UE and a second mini-slot that follows said first uplink slot scheduled for use by the first UE.

Apparatus Embodiment 5 The base station of Apparatus Embodiment 4, wherein said first UE is scheduled only full slots between said first mini-slot and said second mini-slot.

Apparatus Embodiment 6 The base station of Apparatus Embodiment 1, wherein a gap in time exists between at least one of the one or more slots allocated to said first UE or an uplink slot and a mini-slot allocated to the first UE; and wherein said processor is configured to: operate the base station to transmit (214) (e.g. control wireless transmitter 314 to transmit) information indicating the position of said gap and a duration of said gap to the first UE as part of said first grant message, as part of being configured to operate the base station to transmit (212) said single UL grant message to the first UE communicating a grant of the scheduled combination of one or more uplink slots and said at least one mini-slot.

Apparatus Embodiment 7 The base station of Apparatus Embodiment 6, wherein said gap is an integer multiple of said first predetermined duration.

Apparatus Embodiment 8 The base station of Apparatus Embodiment 6, wherein said gap is indicated by indicating positions in a uplink timing structure of slots and mini-slots scheduled for use by the first user equipment (UE) or by indicating a continuous sequence of slots and mini-slots with the location of the gap in the contiguous slots being indicated in the grant message, or the location of the gap is indicated using a combination of the grant message and a channel occupancy structure indicated using a common control message.

Apparatus Embodiment 9 The base station of Apparatus Embodiment 1, wherein said granted slots and mini-slots include slots which vary in time and frequency resource; and wherein the grant transmitted to the first UE includes information indicating sets of time and frequency resources to which the allocated slots and mini-slot correspond.

Apparatus Embodiment 10 The base station of Apparatus Embodiment 1, wherein said processor is further configured to: operate the base station to receive (218) (e.g., control wireless receiver 312 to receive) a signal from said first UE indicating that the first UE does not need at least some of the granted uplink slots or mini-slots.

Apparatus Embodiment 11 The base station of Apparatus Embodiment 10, wherein said processor is configured to: operate the base station to receive (220) a null buffer status report from said first UE in one of said granted UL slots or mini-slots, as part of being configured to operate the base station to receive (218) a signal from said first UE indicating that the first UE does not need at least some of the granted uplink slots or mini-slots.

Apparatus Embodiment 12 The base station of Apparatus Embodiment 10, wherein said processor is configured to: operate the base station to receive (222) a message in licensed spectrum from said first UE in licensed spectrum indicating that said first UE does not need at least some of the granted uplink slots or mini-slots, as part of being configured to operate the base station to receive (218) a signal from said first UE indicating that the first UE does not need at least some of the granted uplink slots or mini-slots.

Apparatus Embodiment 13 The base station of Apparatus Embodiment 10, wherein said processor is further configured to: re-allocate (224) resources (e.g., slots and/or mini-slots) which were previously granted to the first UE but are no longer needed by the first UE, to a second UE.

Apparatus Embodiment 14 The base station of Apparatus Embodiment 1, wherein said received single UL grant corresponds to configured grant UL transmissions (e.g., in accordance with a predetermined configured fixed timing structure).

Apparatus Embodiment 15 The base station of Apparatus Embodiment 1, wherein said received single UL grant corresponds to dynamically scheduled uplink transmissions.

Apparatus Embodiment 16 The base station of Apparatus Embodiment 1, wherein said received single UL grant is communicated in a Downlink Control Information (DCI) channel.

Apparatus Embodiment 17 The base station of Apparatus Embodiment 1, wherein said one or more slots and said at least one mini-slot correspond to new radio unlicensed spectrum.

LIST OF EXEMPLARY COMPUTER READABLE MEDIUM EMBODIMENTS

Computer Readable Medium Embodiment 1 A non-transitory computer readable medium (310) including computer executable instructions which when executed by a processor (302) control a base station (300) to perform the steps of: scheduling a first user equipment (UE) (150) for uplink transmission in a combination of one or more uplink slots and at least one mini-slot, said uplink slot having a first predetermined duration, said mini-slot having a second predetermined duration which is smaller than said first predetermined duration; and transmitting a single UL grant message to the first UE (150) communicating a grant of the scheduled combination of said one or more uplink slots and said at least one mini-slot.

The techniques of various embodiments may be implemented using software, hardware and/or a combination of software and hardware. Various embodiments are directed to apparatus, e.g., user devices such as a user equipment (UE) device, base stations such as a eNB, gNB or ng-eNB, large cell base station, small cell base stations, femto cell base stations, pico cell base stations, network nodes, an AMF device, core network nodes, a network management node, a SON node, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station, the method comprising:
scheduling a first user equipment (UE) for uplink transmission in a combination of one or more uplink slots and a plurality of mini-slots, said one or more uplink slots including an uplink slot having a first predetermined duration, said plurality of mini-slots including a first mini-slot that precedes a first uplink slot scheduled for use by the first UE and a second mini-slot that follows said first uplink slot scheduled for use by the first UE, said first UE being scheduled only full slots between said first mini-slot and said second mini-slot, at least one of said first mini-slot and said second mini-slot having a second predetermined duration which is smaller than said first predetermined duration; and
transmitting a single uplink (UL) grant message to the first UE communicating a grant of the scheduled combination of said one or more uplink slots and said plurality of mini-slots.

2. The method of claim 1, wherein said second predetermined duration is an integer fraction of said first predetermined duration.

3. The method of claim 1, wherein said first mini-slot follows a time period during which a listen before talk (LBT) procedure is performed.

4. The method of claim 3, wherein said one or more uplink slots includes two slots.

5. The method of claim 1, wherein said granted slots and mini-slots include slots which vary in time and frequency resource; and
wherein the single UL grant message transmitted to the first UE includes information indicating sets of time and frequency resources to which the granted slots and mini-slot correspond.

6. The method of claim 1, further comprising:
receiving a signal from said first UE indicating that the first UE does not need at least some of the granted uplink slots or mini-slots.

7. The method of claim 6, wherein receiving a signal from said first UE indicating that the first UE does not need at least some of the granted uplink slots or mini-slots includes:
receiving a null buffer status report from said first UE in one of said granted UL slots or mini-slots.

8. The method of claim 6, wherein receiving a signal from said first UE indicating that the first UE does not need at least some of the granted uplink slots or mini-slots includes:
receiving a message in licensed spectrum from said first UE indicating that said first UE does not need at least some of the granted uplink slots or mini-slots.

9. The method of claim 6, further comprising:
re-allocating resources which were previously granted to the first UE but are no longer needed by the first UE, to a second UE.

10. A method of operating a base station, the method comprising:
scheduling a first user equipment (UE) for uplink transmission in a combination of one or more uplink slots and at least one mini-slot, said uplink slot having a first predetermined duration, said mini-slot having a second predetermined duration which is smaller than said first predetermined duration; and
transmitting a single UL grant message to the first UE communicating a grant of the scheduled combination of said one or more uplink slots and said at least one mini-slot;
wherein a gap in time exists between i) at least one of the one or more slots granted to said first UE or an uplink slot and ii) a mini-slot; and
wherein transmitting said single UL grant message to the first UE communicating the grant of the scheduled combination of one or more uplink slots and said at least one mini-slot includes:
transmitting information in said single UL grant message indicating the position of said gap and a duration of said gap to the first UE as part of said single grant message, said information indicating the position and duration of said gap by i) indicating positions in an uplink timing structure of slots and mini-slots scheduled for use by the first user equipment (UE) or ii) indicating a continuous sequence of slots and mini-slots along with a location of the gap in the contiguous slots.

11. The method of claim 10, wherein said gap is an integer multiple of said first predetermined duration.

12. A base station comprising:
a processor configured to:
schedule a first user equipment (UE) for uplink transmission in a combination of one or more uplink slots and a plurality of mini-slots, said one or more uplink slots including an uplink slot having a first predetermined duration, said plurality of mini-slots including a first mini-slot that precedes a first uplink slot scheduled for use by the first UE and a second mini-slot that follows said first uplink slot scheduled for use by the first UE, said first UE being scheduled only full slots between said first mini-slot and said second mini-slot, at least one of said first mini-slot and said second mini-slot having a second predetermined duration which is smaller than said first predetermined duration; and
operate the base station to transmit a single uplink (UL) grant message to the first UE communicating a grant of the scheduled combination of said one or more uplink slots and said plurality of mini-slots.

13. The base station of claim 12, wherein a gap in time exists between at least one of the one or more slots granted to said first UE or an uplink slot and a mini-slot granted to the first UE; and
wherein said processor is configured to:
operate the base station to transmit information indicating the position of said gap and a duration of said gap to the first UE as part of said single UL grant message, as part of being configured to operate the base station to transmit said single UL grant message to the first UE communicating a grant of the scheduled combination of one or more uplink slots and said at least one mini-slot.

14. The base station of claim 13, wherein said gap is indicated by indicating positions in a uplink timing structure of slots and mini-slots scheduled for use by the first user equipment (UE) or by indicating a continuous sequence of slots and mini-slots with the location of the gap in the contiguous slots being indicated in the single UL grant message.

15. The base station of claim 12, wherein said granted slots and mini-slots include slots which vary in time and frequency resource; and
   wherein the grant transmitted to the first UE includes information indicating sets of time and frequency resources to which the granted slots and mini-slot correspond.

16. The base station of claim 12, wherein said processor is further configured to:
   operate the base station to receive a signal from said first UE indicating that the first UE does not need at least some of the granted uplink slots or mini-slots.

17. The base station of claim 16, wherein said processor is further configured to:
   re-allocate resources which were previously granted to the first UE but are no longer needed by the first UE, to a second UE.

18. A non-transitory computer readable medium including computer executable instructions which when executed by a processor control a base station to perform the steps of:
   scheduling a first user equipment (UE) for uplink transmission in a combination of one or more uplink slots and a plurality of mini-slots, said one or more uplink slots including an uplink slot having a first predetermined duration, said plurality of mini-slots including a first mini-slot that precedes a first uplink slot scheduled for use by the first UE and a second mini-slot that follows said first uplink slot scheduled for use by the first UE, said first UE being scheduled only full slots between said first mini-slot and said second mini-slot, at least one of said first mini-slot and said second mini-slot having a second predetermined duration which is smaller than said first predetermined duration; and
   transmitting a single uplink (UL) grant message to the first UE communicating a grant of the scheduled combination of said one or more uplink slots and said plurality of mini-slots.

* * * * *